United States Patent
Broere

(10) Patent No.: US 10,693,264 B2
(45) Date of Patent: Jun. 23, 2020

(54) PROTECTIVE HOOD FOR OUTDOOR ELECTRICAL OUTLETS

(71) Applicant: A. C. DANDY PRODUCTS LTD., Wetaskiwin (CA)

(72) Inventor: Hans Broere, Wetaskiwin (CA)

(73) Assignee: A. C. Dandy Products Ltd., Wetaskiwin (CA)

( * ) Notice: Subject to any disclaimer, the term of this patent is extended or adjusted under 35 U.S.C. 154(b) by 0 days.

(21) Appl. No.: 16/504,295

(22) Filed: Jul. 7, 2019

(65) Prior Publication Data

US 2019/0334300 A1   Oct. 31, 2019

Related U.S. Application Data

(60) Continuation of application No. 16/055,143, filed on Aug. 5, 2018, now Pat. No. 10,367,314, which is a
(Continued)

(51) Int. Cl.
*H01R 24/00* (2011.01)
*H01R 24/78* (2011.01)
(Continued)

(52) U.S. Cl.
CPC .............. *H01R 24/78* (2013.01); *B60L 53/16* (2019.02); *B60L 53/31* (2019.02); *H01R 13/5213* (2013.01); *H02G 3/0493* (2013.01); *H02G 3/088* (2013.01); *H02G 3/14* (2013.01); *H01R 13/7135* (2013.01); *H02B 1/50* (2013.01); *Y02T 10/7005* (2013.01); *Y02T 10/7072* (2013.01);
(Continued)

(58) Field of Classification Search
CPC ....... H01J 5/24; H05K 5/0069; H05K 5/0091; H05K 5/00; H05K 5/02; H02G 3/08; H02G 3/00; H02G 3/0431; H02G 3/10; H02G 3/081; H02G 3/0493; H02G 3/088; H02G 3/14; H02B 1/40; H02B 1/50; B60R 16/0239; H01R 24/78; H01R 13/5213; H01R 13/7135; B60L 53/16; B60L 53/31; Y02T 10/7005; Y02T 10/7072; Y02T 90/121; Y02T 90/128; Y02T 90/14
See application file for complete search history.

(56) References Cited

U.S. PATENT DOCUMENTS 3,439,108 A * 4/1969 Zerwes .............. H01R 13/5213
174/53
4,519,657 A   5/1985 Jensen
(Continued)

*Primary Examiner* — Pete T Lee
(74) *Attorney, Agent, or Firm* — Donald V. Tomkins

(57) ABSTRACT

A protective hood for outdoor electrical outlets or receptacles has a top surface, two side panels, and an angled bottom surface having an aperture. In one variant of the protective hood, the aperture in is configured to receive power cords for connection to an electrical outlet over which the protective hood has been mounted, such as an existing electrical outlet installed on a building wall or a power pedestal. In another variant of the protective hood, the aperture in the angled bottom surface is configured to allow an electrical outlet to be installed directly therein, but with the protective hood still being mountable over an electrical outlet on a building wall or power pedestal instead of having an electrical outlet installed in the aperture.

8 Claims, 28 Drawing Sheets

Related U.S. Application Data continuation-in-part of application No. 15/617,210, filed on Jun. 8, 2017, now abandoned, which is a division of application No. 14/519,301, filed on Oct. 21, 2014, now abandoned.

(60) Provisional application No. 61/893,524, filed on Oct. 21, 2013.

(51) Int. Cl.

| | | |
|---|---|---|
| *H01R 13/52* | (2006.01) | |
| *H02G 3/04* | (2006.01) | |
| *H02G 3/08* | (2006.01) | |
| *H02G 3/14* | (2006.01) | |
| *B60L 53/31* | (2019.01) | |
| *B60L 53/16* | (2019.01) | |
| *H01R 13/713* | (2006.01) | |
| *H02B 1/50* | (2006.01) | |

(52) U.S. Cl.
CPC ............ *Y02T 90/121* (2013.01); *Y02T 90/128* (2013.01); *Y02T 90/14* (2013.01)

(56) References Cited

U.S. PATENT DOCUMENTS

| | | | |
|---|---|---|---|
| 4,674,813 A | | 6/1987 | Feldner |
| 4,785,376 A | | 11/1988 | Dively |
| 4,951,182 A | * | 8/1990 | Simonson ............... F21S 8/081 312/100 |
| 5,184,279 A | * | 2/1993 | Horn ........................ H02B 1/50 174/38 |
| 7,361,832 B2 | | 4/2008 | Dively |
| 7,820,911 B1 | * | 10/2010 | Gretz ....................... H02G 3/14 174/53 |
| 8,404,973 B1 | | 3/2013 | Gretz |
| 9,091,377 B2 | * | 7/2015 | Lechuga ............... F16L 59/18 |
| 2007/0284370 A1 | * | 12/2007 | Dively ................ H02G 3/0493 220/3.8 |
| 2014/0020925 A1 | | 1/2014 | Seff et al. |
| 2014/0220925 A1 | * | 8/2014 | Moser .................. H04W 48/18 455/404.1 |

\* cited by examiner

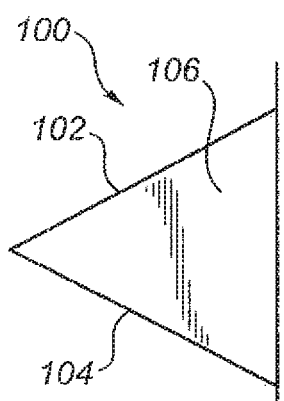
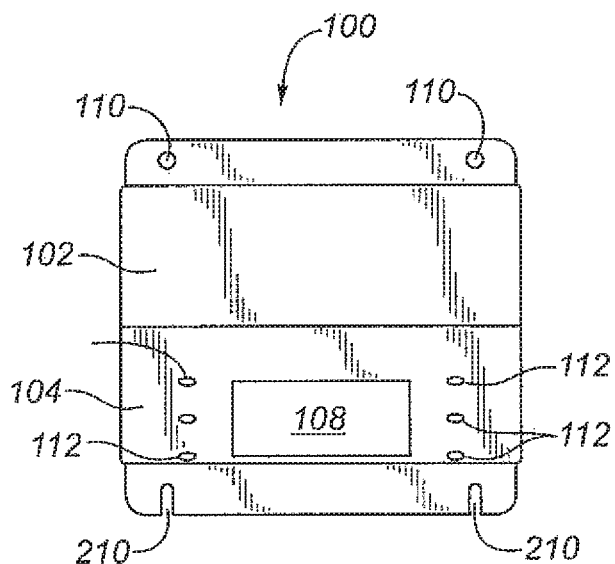
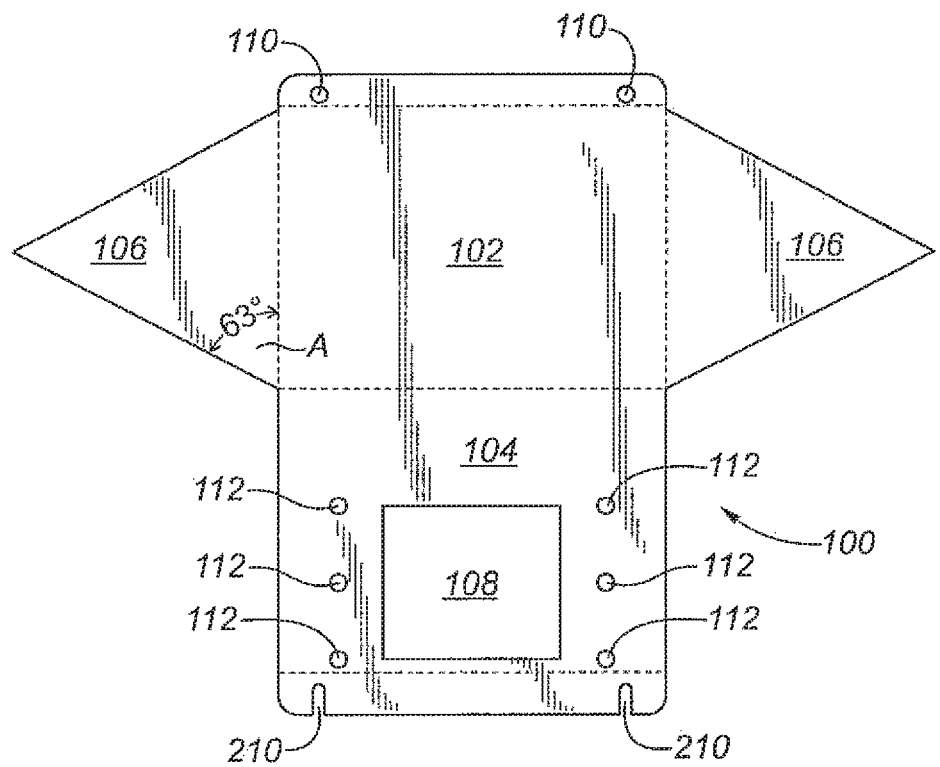
FIG. 4A
FIG. 4B
FIG. 4C

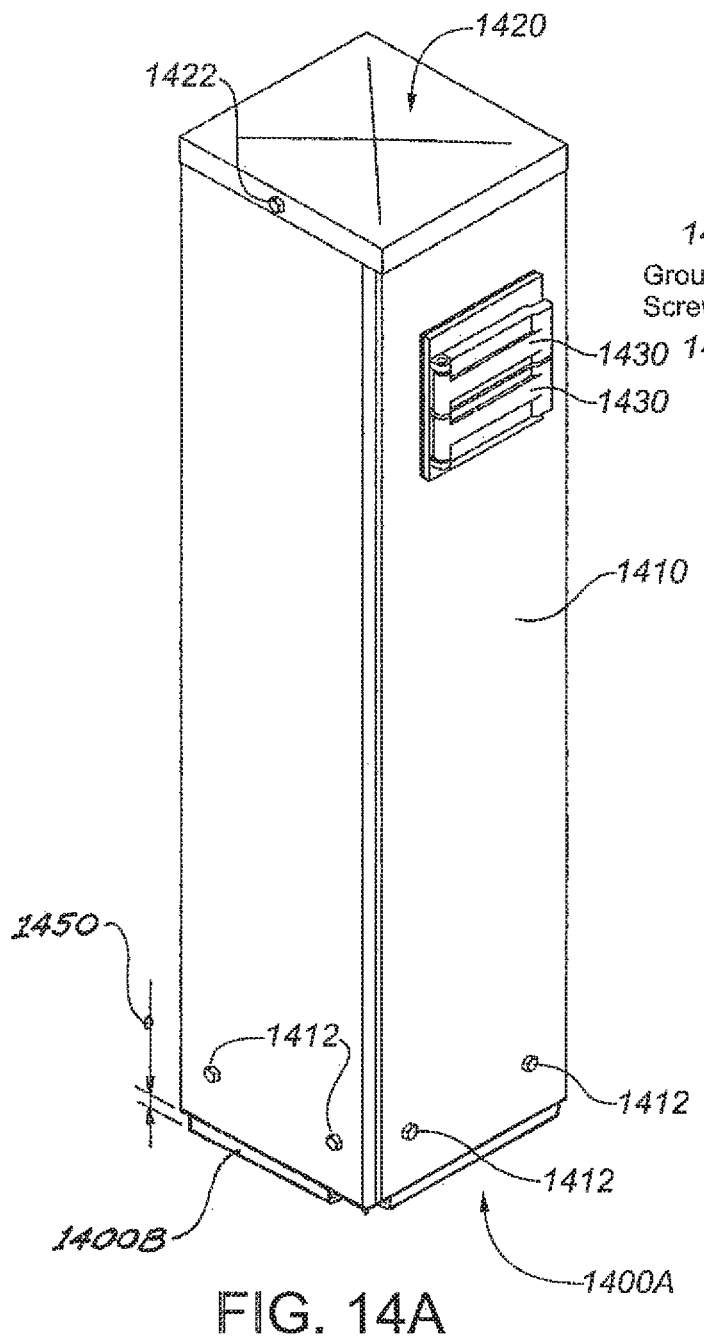
FIG. 14A
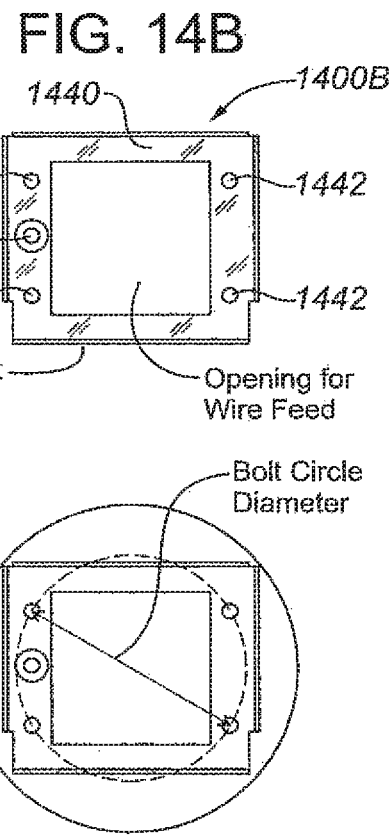
FIG. 14B
FIG. 14C

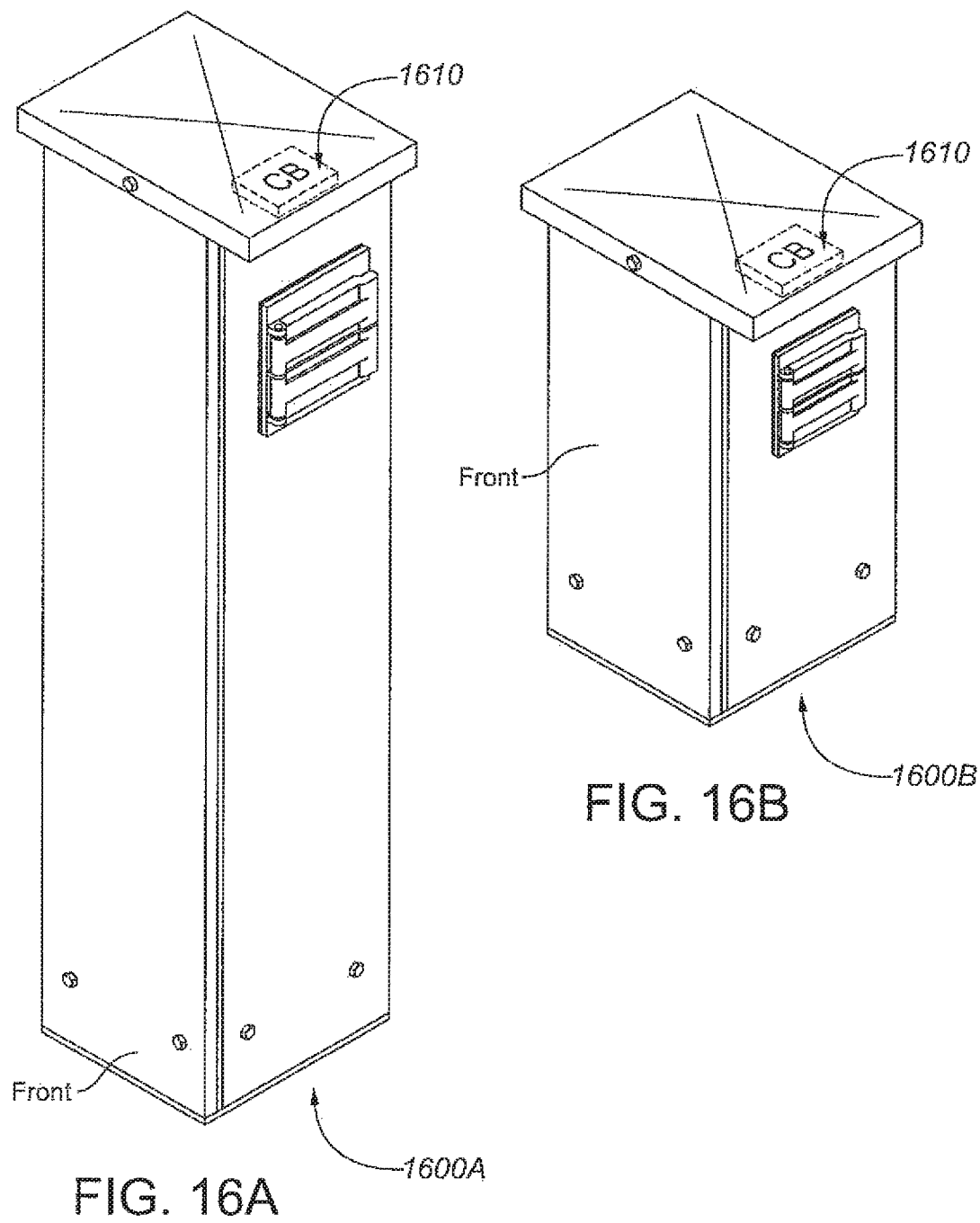

(1 Phase, 3 Wire Style)

(1 Phase, 3 Wire Style)

(3 Phase, 4 Wire Style)

(3 Phase, 4 Wire Style)

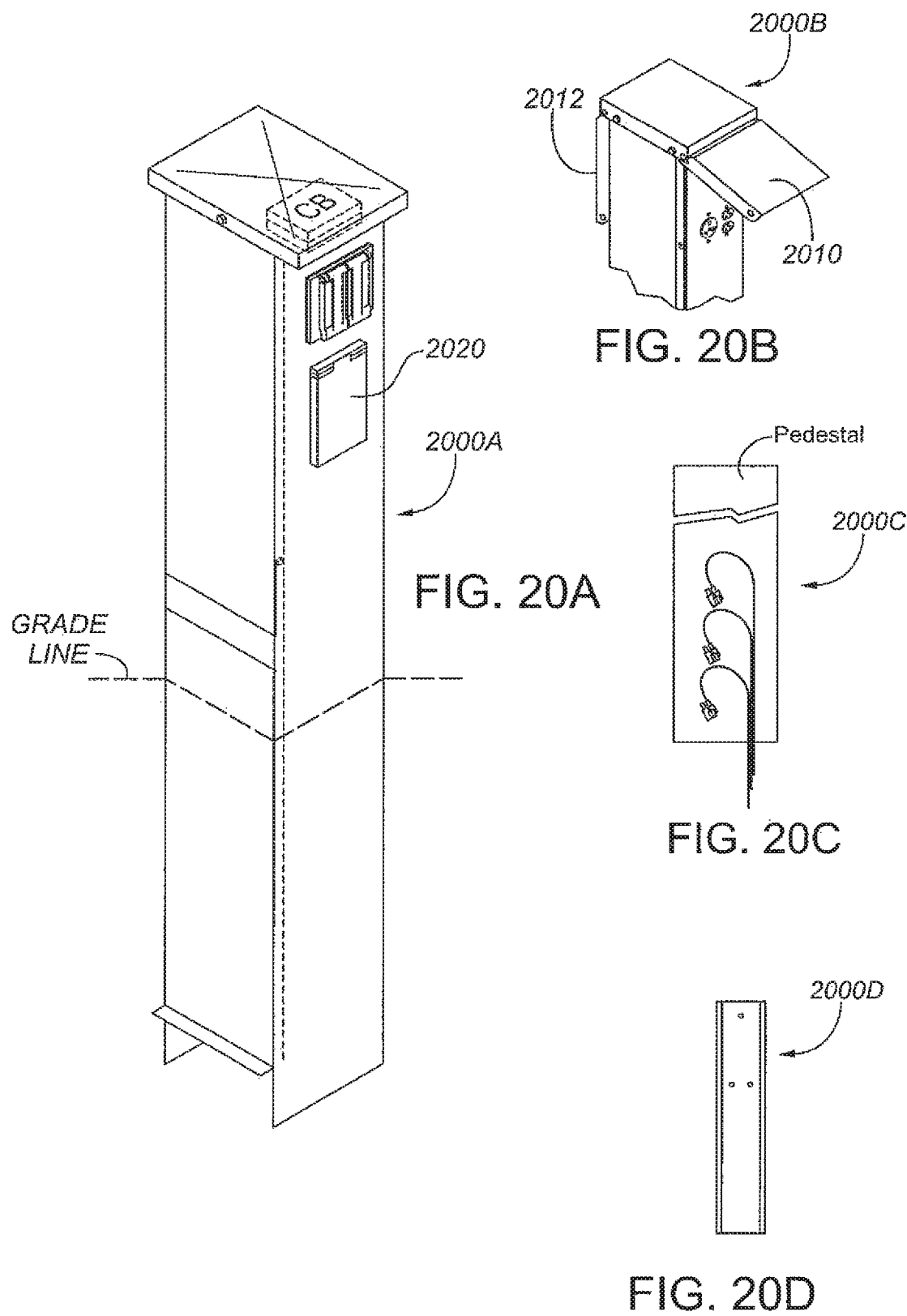

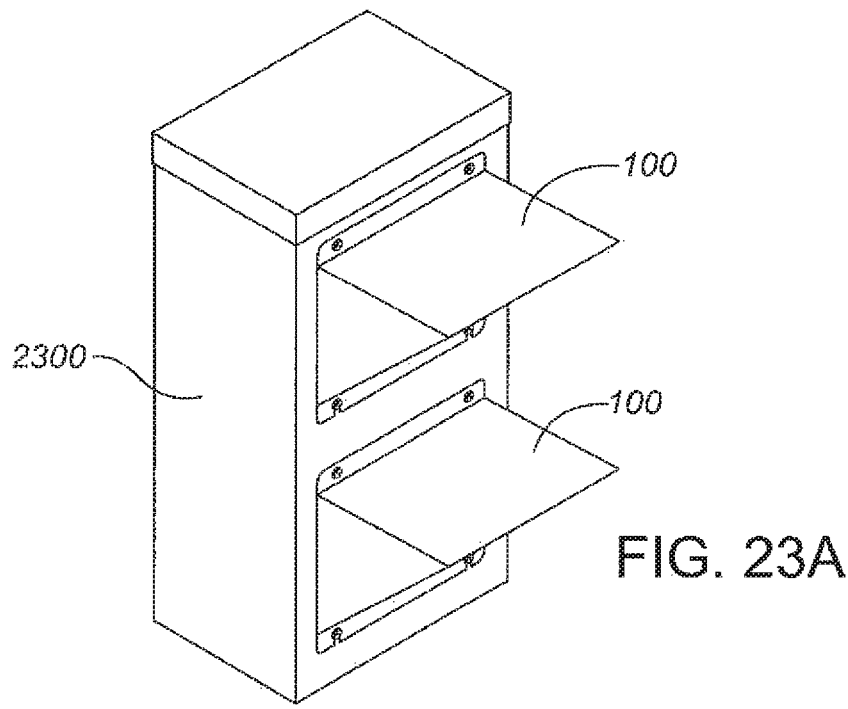
FIG. 23A
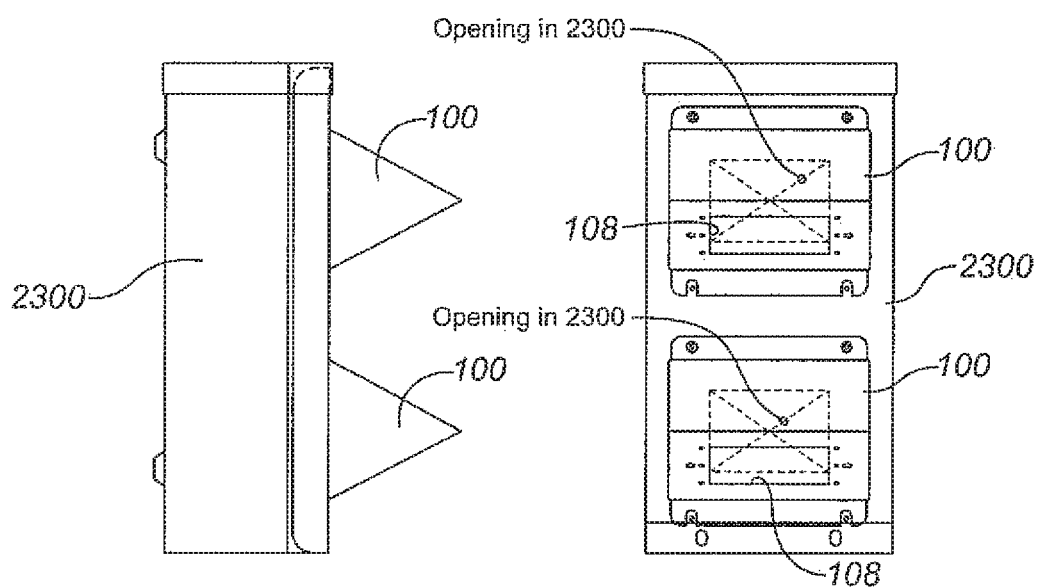
FIG. 23C
FIG. 23B

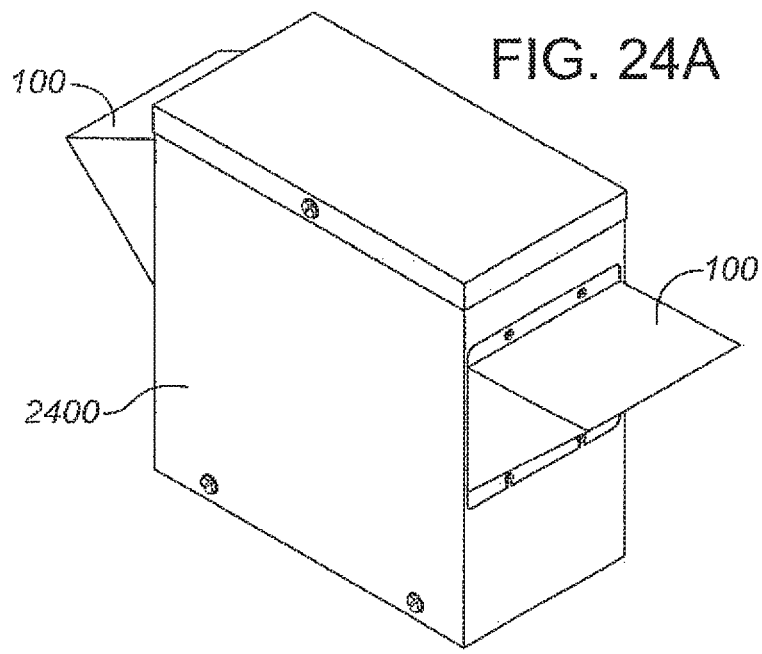
FIG. 24A
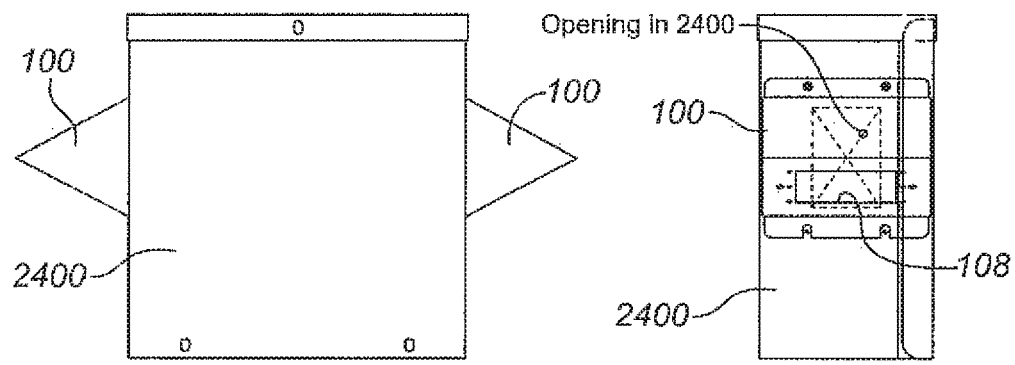
FIG. 24C
FIG. 24B

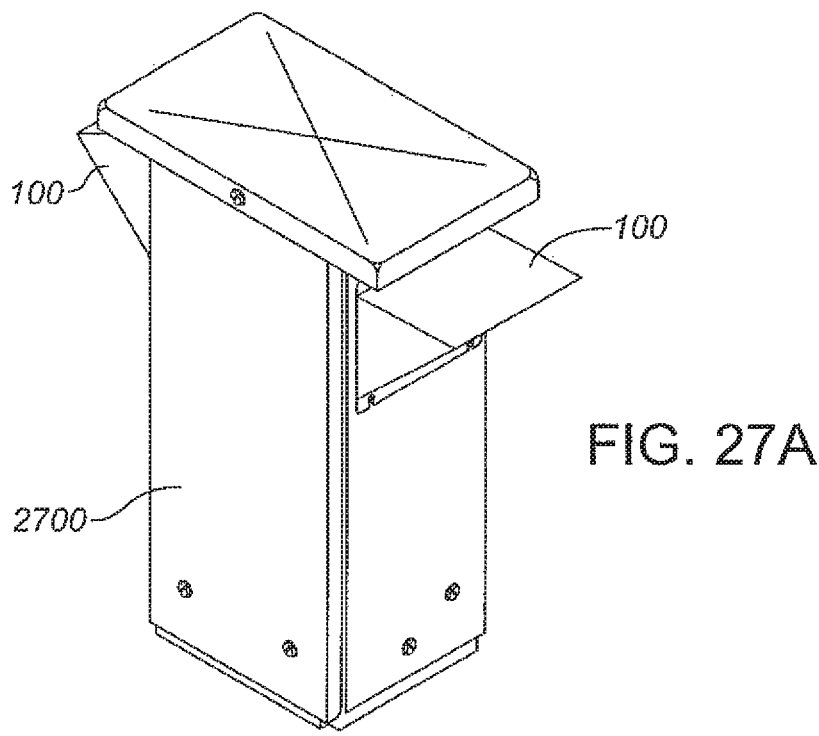
FIG. 27A
FIG. 27B
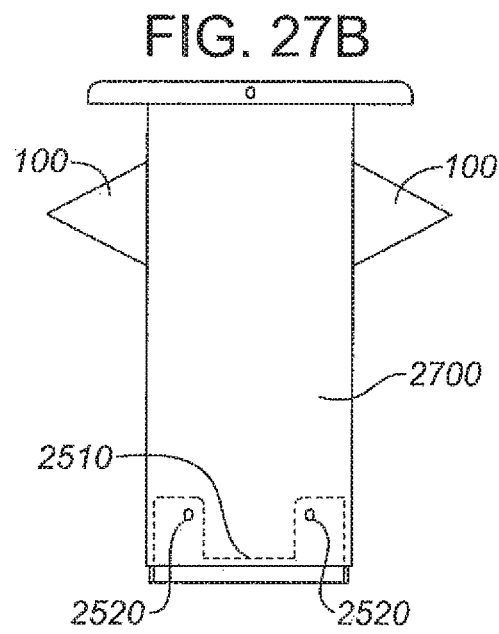
FIG. 27C
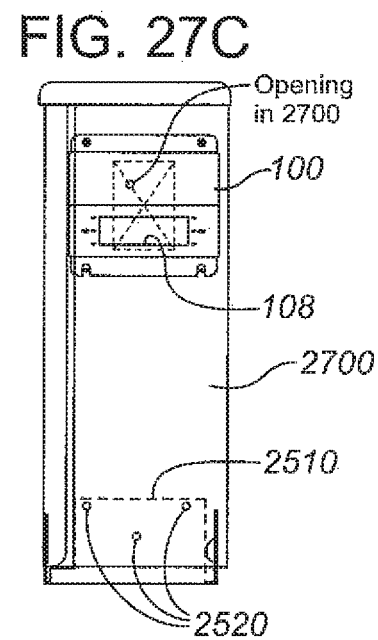

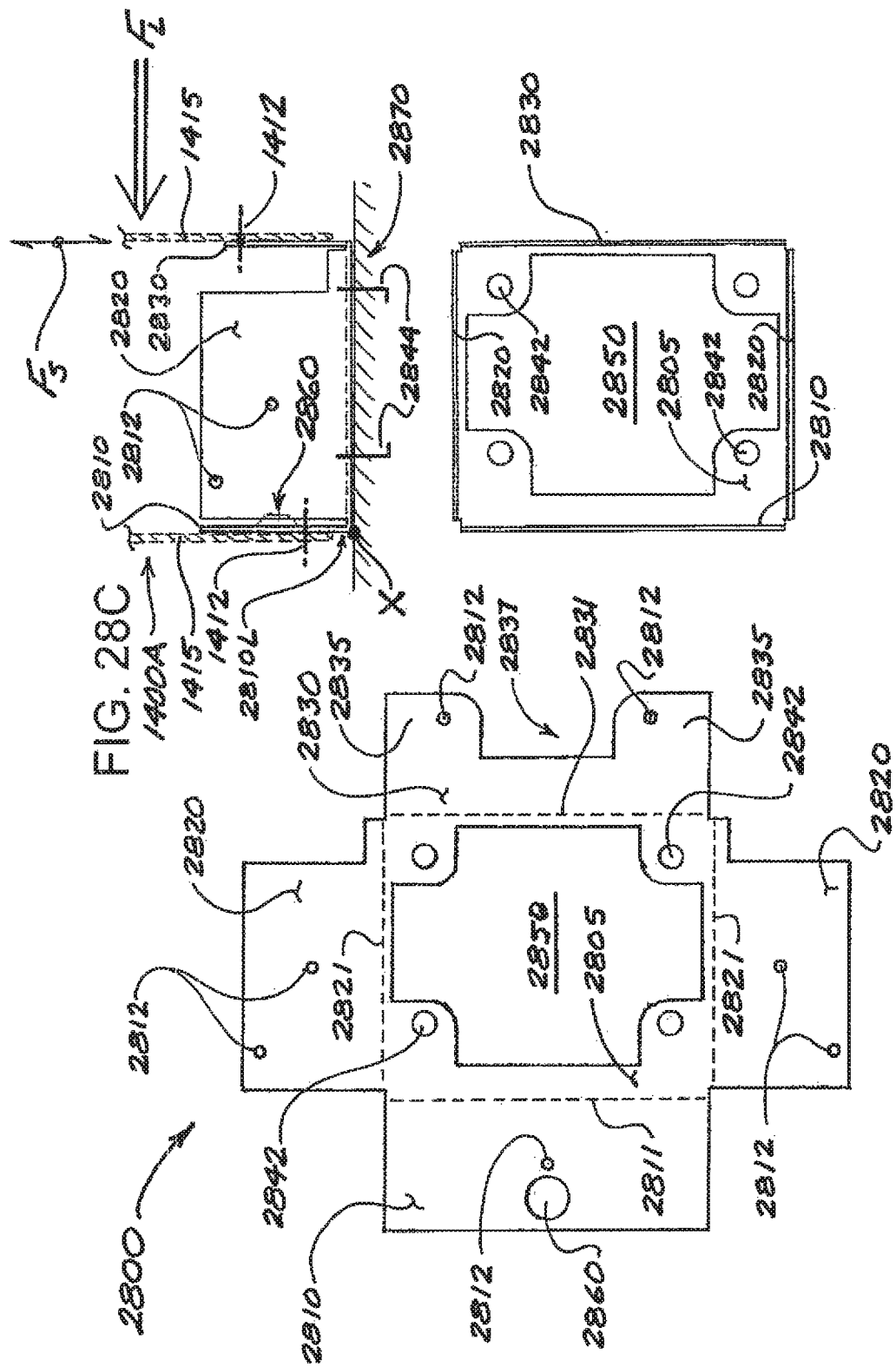

PROTECTIVE HOOD FOR OUTDOOR ELECTRICAL OUTLETS

FIELD

The present disclosure relates to outdoor electrical outlets or receptacles and more particularly to protective apparatus for protecting the outlets from a wide range of weather conditions. The disclosure further relates to power pedestals, and to electrical outlets provided on power pedestals.

BACKGROUND

Conventional outdoor receptacles are typically protected by flip covers that are positioned over individual receptacles or outlets, or by outlet covers with hinged doors that lift to provide access to the outlets. Such flip covers may include gaskets for weather sealing, typically either on the covers themselves, or around the perimeter of the base frame against which the flip cover will rest.

While generally functional during fair weather, prior art protective devices for outdoor electrical outlets or receptacles suffer from a number of limitations. For example, in temperatures at or below freezing, the flip covers are often sealed by ice against the frame such that the flip covers cannot be lifted to access the outlet. Even if the flip covers can be lifted to plug into an outlet, ice and snow may accumulate while the flip cover is lifted, exposing a significant area of the electrical outlet to accumulation of ice and snow. This may prevent the flip cover from closing completely, as the ice and snow may prevent clean contact between the flip cover and the base frame. Furthermore, the flip cover itself may be frozen in the open position, making it difficult or impossible to close.

In addition, over time, the weather sealing gasket on or around the flip cover may deteriorate, and no longer keep out moisture from the electrical outlet, possibly allowing moisture to seep into the electrical outlet and potentially causing an electrical safety problem. While use of GFCI (Ground Fault Circuit Interrupter) receptacles, may help avoid serious electrical shocks, the electrical outlet may nevertheless become damaged from the moisture, and have to be replaced at significant cost.

Power pedestals are often used to provide outlets or receptacles for accessing electricity outdoors, and are commonly used in applications such as outdoor parking lots or driveways to recharge electric vehicles or to power a block heater, for example. In such outdoor applications, power pedestals are often positioned in locations in which vehicles may come into accidental contact with the power pedestals. Even a minor collision may result in major damage to power pedestals, resulting in sufficient damage requiring replacement of the housing, or the entire unit.

As well, power pedestals are often subjected to adverse weather, and moisture trapped within or around the pedestals may damage them and cause them to fail or become unsightly prematurely.

Therefore, what is needed are improved designs for the protection of outdoor electrical outlets or receptacles and power pedestals that addressing at least some of the above limitations in the prior art.

SUMMARY

The present disclosure relates to a protective apparatus for outdoor electrical outlets or receptacles and power pedestals subjected to a wide range of weather conditions including variations in temperature, humidity, and precipitation, and various improvements thereto. In particular, electrical outlets provided on power pedestals are considered.

In an embodiment, the protective apparatus is an angled hood which has at least one angled top surface, at least two side panels, and an angled bottom surface having an aperture suitably sized and shaped to receive a power cord from an electrical device.

In a preferred embodiment, the top surface of the hood is angled and extends to a suitable horizontal distance such that when mounted over an electrical outlet installed in support structure such as a building wall or a power pedestal, the hood will substantially cover and protect the electrical outlet. It will be appreciated, however, that the angle of the top surface of the hood, and the distance of the hood from the wall or power pedestal may be varied within any suitable range.

In another embodiment, the top surface of the hood may extend to a suitable horizontal distance such the electrical outlet being covered is suitably protected from moisture, including rain and snow that may be directed towards the outlet at an angle. Thus, the electrical outlet is suitably protected even if access to the electrical outlet always remains open through the aperture in the angled bottom surface.

By adjusting the angle of the top surface of the hood, how far the hood extends horizontally, and the size of the aperture in the angled bottom surface, the hood may be adjusted for virtually any type and size of electrical outlet requiring protection.

In another aspect, the protective hood may be installed over electrical outlets or receptacles provided on a power pedestal. The power pedestal may be installed in outdoor areas subject to a wide range of weather conditions including moisture in the form of rain or snow, for example.

In an embodiment, the power pedestal may comprise a mounting plate including a box to mount various types of outlets or receptacles therein. The mounting plate may be configured to receive various types of standard electrical outlets, and may be mounted in a vertical or horizontal orientation depending on the mounting configuration. A protective hood may be mounted over each outlet or receptacle using a number of different mounting means including use of fasteners, adhesives, or mechanical engagement. Preferably, the protective hoods are removable such that the outlet may be serviced or the protective hoods may be replaced easily if damaged.

In an embodiment, when a plurality of protective hoods are mounted vertically, each of the protective hoods may optionally be installed in an overlapping configuration such that the top edge of a protective hood is covered by a bottom edge of a protective hood installed above. The uppermost protective hood may have its top edge covered by a pedestal lid, which at least partially overhangs the top of the pedestal on each side. Advantageously, moisture is directed away from all of the outlets, and each pedestal above may also protect the pedestal below.

In another embodiment, each protective hood is configured such that the aperture provided on the angled bottom surface includes a flange or lip extending outwardly to direct moisture around the aperture rather than dripping from its edge. Correspondingly, a flange or lip extending inwardly along the bottom edge of the aperture may also help direct moisture away from the edges of the aperture.

In another embodiment, each pedestal may be mounted to a pedestal base that is configured to provide sufficient strength to support the pedestal structure including all mounted hardware, but which pedestal base also includes stress-relief means whereby the pedestal will break away either partially or completely from the base if the pedestal is accidentally struck, for example by a motor vehicle or trailer that is backing up in a driveway, parking lot, or RV camp site at which the power pedestal is installed. The stress-relief means is preferably designed and configured such that when a lateral force is applied to the pedestal (e.g., by vehicular impact), the pedestal will break away either partially or completely from the pedestal base before the pedestal or any part of it experiences structural overload due to the applied lateral force. Although localized or overall structural failure of the pedestal cannot be prevented in all possible circumstances (due to uncertainty as to the magnitude of any lateral force that might be applied to the pedestal), in common pedestal impact scenarios the stress-relief means will prevent significant deformation or other damage to the pedestal after a vehicular impact, such that the pedestal can be readily returned to service by replacing the damaged original pedestal base with a new one.

Protective hoods in accordance with the present disclosure also may be configured to be deformable, such that the protective hoods can at least partially absorb vehicular impact, and can be readily replaced if damaged.

In another embodiment, the aperture in the protective hood is suitably large to provide sufficient ventilation for the one or more outlets covered by the protective hood. This allows the pedestal to dry after heavy precipitation, without trapping moisture in any part of the protective hood.

In another embodiment, a slight gap is provided between the power pedestal and the pedestal base to improve ventilation to the pedestal cabinet (i.e., interior of the pedestal), and to prevent the elongate of the pedestal body from collecting moisture at its base around the bottom of the power pedestal.

In another embodiment, the pedestal itself may include a ventilation grill which prevents moisture from entering the pedestal but at the same time allows air to circulate within the pedestal cabinet. The ventilation grill may be provided on two or more sides of the pedestal in order to promote airflow through the pedestal cabinet in order to control moisture.

In one particular aspect, the present disclosure teaches a power pedestal assembly comprising a pedestal body having an upper end and a lower end; a pedestal base adapted for mounting to a support element, and for connection to the lower end of the pedestal body; and stress-relief means associated with the connection of the pedestal body to the pedestal base, such that when a lateral force is applied to the pedestal body, the pedestal body will break away at least partially from the pedestal base before the pedestal body experiences structural overload.

In one embodiment of the power pedestal assembly, the pedestal body comprises a square tube; and the pedestal base comprises a central plate, a rear flange, two opposing side flanges, and a front flange, wherein said rear, side, and front flanges project vertically upward from the central plate and are configured to fit within the lower end of the pedestal body. The lower end of the pedestal body is mounted over the rear, side, and front flanges of the pedestal base, and is connected to one or more of said flanges by one or more fasteners. In such embodiments, the stress-relief means may alternatively be provided:

by configuring the flanges and the fasteners such that in the event of a shearing force being induced in the plane of the interface between a selected one of the flanges and the pedestal body, at least one of the one or more fasteners connecting the pedestal body to the selected flange will shear off before the selected flange experiences structural overload; or by configuring the flanges and the fasteners such that in the event of a shearing force being induced in the plane of the interface between a selected one of the flanges and the pedestal body, the selected flange will experience structural overload before the one or more fasteners connecting the pedestal body to the selected flange experience structural overload, in which case the structural overload experienced by the selected flange may be in the form localized tearing of the flange in the vicinity of the one or more fasteners, or in the form of tensile failure of the selected flange. In a variant embodiment, the selected flange may be is formed with a cut-out section such that the selected flange defines one or more sub-flanges adjacent to the cut-out section, and wherein the tensile failure of the selected flange occurs in one or more of the one or more sub-flanges.

Optionally, at least one of the rear, side, and front flanges may be provided with a ground wire termination point to facilitate grounding of the pedestal body at a location elevated above the central plate of the pedestal base.

BRIEF DESCRIPTION OF THE DRAWINGS

Embodiments will now be described with reference to the accompanying Figures, in which numerical references denote like parts, and in which:

FIGS. 4A and 4B show schematic plan views of a protective hood in accordance with another embodiment.

FIG. 4C shows a schematic plan view of a flat sheet which may be folded into the protective hood of FIGS. 4A and 4B.

FIGS. 14A to 14C show an illustrative power pedestal in accordance with an embodiment.

FIGS. 16A and 16B show alternative embodiments of power pedestals in accordance with another embodiment.

FIGS. 20A to 20D show another illustrative power pedestal in accordance with still another embodiment.

FIGS. 21A-21C, 22A-22C, 23A-23C, 24A-24C, 25A-25D, 26A-26D, and 27A-27C show isometric views and corresponding plan views of various pedestal designs in accordance with an embodiment.

FIGS. 28A to 28C illustrate an alternative embodiment of a pedestal base in accordance with the present disclosure.

DETAILED DESCRIPTION

Figure 1:
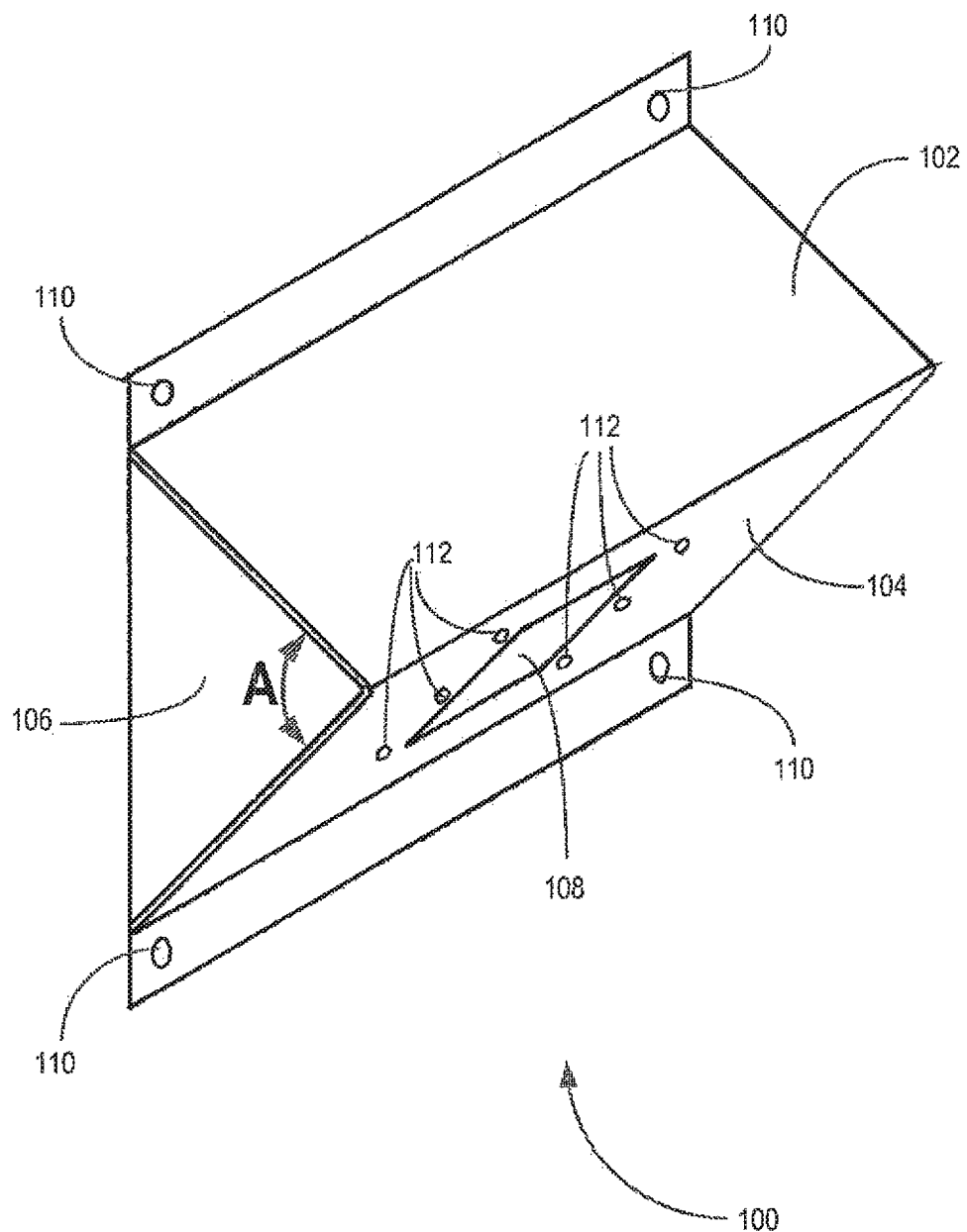
FIG. 1 shows a perspective view of a protective hood in accordance with an illustrative embodiment.

The present disclosure relates to a protective device for outdoor electrical outlets or receptacles, whether provided on outdoor walls or on power pedestals, and subjected to a wide range of weather conditions including variations in temperature, humidity, and precipitation.

In a first aspect, there is provided a protective device for an electrical outlet comprising a protective hood with at least one angled top surface, at least two side panels, and an angled bottom surface having an aperture suitably sized and shaped to receive a power cord from an electrical device. The aperture may also be suitably large to allow sufficient access to a person handling the electrical plug to insert or remove the plug from the outlet.

In a preferred embodiment, the top surface of the hood is angled, and extends to a suitable horizontal distance from the wall such that the hood substantially covers and protects the electrical outlet being covered. It will be appreciated, however, that the angle of the top surface of the hood, and the distance of the hood from the wall may be varied within any suitable range.

The top surface of the hood may extend to a suitable horizontal distance such the electrical outlet being covered is suitably protected from moisture, including rain and snow that may be directed towards the outlet at an angle. Thus, the electrical outlet is suitably protected even if access to the electrical outlet always remains open through the aperture in the angled bottom surface.

By adjusting the angle of the top surface of the hood, how far the hood extends horizontally, and the size of the aperture in the angled bottom surface, the hood may be adjusted for virtually any type and size of electrical outlet requiring protection.

The protective hood may be installed over electrical outlets or receptacles provided on a power pedestal. The power pedestals may be generally shaped as towers of different heights depending on the number of electrical outlets provided on one or more sides of the tower.

In an embodiment, the power pedestals may comprise mounting plate including a box to mount various types of outlets or receptacles therein. The mounting plate may be configured to receive various types of standard electrical outlets, and may be mounted in a vertical or horizontal orientation depending on the mounting configuration. A protective hood may be mounted over each outlet or receptacle using a number of different mounting means including use of fasteners, adhesives, or mechanical engagement.

Preferably, the protective hoods are removable such that the outlet may be serviced or the protective hoods may be replaced easily if damaged.

In an embodiment, when a plurality of protective hoods are mounted vertically, each of the protective hoods may optionally be installed in an overlapping configuration such that the top edge of a protective hood is covered by a bottom edge or skirt of a protective hood installed above. The uppermost protective hood may have its top edge covered by a pedestal lid, which at least partially over hangs the top of the pedestal on each side.

In another embodiment, a plurality of protective hoods may be joined and formed as an integral piece to cover multiple outlets. This may allow multiple protective hoods to be installed or removed together such that multiple outlets may be accessed for service more easily.

In another embodiment, each protective hood is configured such that the aperture provided on the angled bottom surface includes a flange or lip extending outwardly to direct moisture around the aperture rather than dripping from its edge. Correspondingly, a flange or lip extending inwardly along the bottom edge of the aperture may also help direct moisture away from the edges of the aperture.

In another embodiment, the aperture in the protective hood is suitably large to provide sufficient ventilation for the one or more outlets covered by the protective hood. This allows the pedestal to dry after heavy precipitation, without trapping moisture in any part of the protective hood.

In another embodiment, the pedestal itself may include a ventilation grill which prevents moisture from entering the pedestal but at the same time allows air to circulate within the pedestal cabinet. The ventilation grill may be provided on two or more sides of the pedestal in order to promote airflow through the pedestal cabinet in order control moisture.

In another embodiment, each pedestal may be mounted to a pedestal base that is configured to provide sufficient strength to support the pedestal structure including all mounted hardware, but which pedestal base also includes one or more built in stress-relief features such that the pedestal will break away either partially or completely from the base if the pedestal is accidentally struck, for example by a motor vehicle or trailer that is backing up in a driveway, parking lot, or RV camp site at which the power pedestal is installed. In this embodiment, the protective hoods may also be configured to be deformable, such that the protective hoods can at least partially absorb the impact of the motor vehicle or trailer, and can be readily replaced with another if damaged.

In this respect, before explaining at least one embodiment of the various improvements in more detail, it is to be understood that the present system and method is not limited in its application to the details of construction and to the arrangements of the components set forth in the following description or illustrated in the drawings. The present system and method are capable of other embodiments and of being practiced and carried out in various ways. Also, it is to be understood that the phraseology and terminology employed herein are for the purpose of description and should not be regarded as limiting.

Illustrative embodiments in accordance with the present disclosure will now be described with reference to the drawings.

FIG. 1 is a perspective view of a protective hood 100 in accordance with an illustrative embodiment. As shown, hood 100 includes an angled top surface 102, an angled bottom surface 104, and two side panels 106 adjoined to the top surface 102 and abutting bottom surface 104 along its edges. Suitable weather sealing may be provided along the length of bottom surface 104 to prevent moisture from penetrating through any gaps. Alternatively, with hood 100 formed from a suitable metal, side panel 106 may be welded to the bottom surface to form a complete, weatherproof seal. Bottom surface 104 includes an aperture 108 suitably shaped and sized to receive an electrical power cord and plug from an electrical appliance or electrical device. Bottom surface 104 is shown having fastener holes 112 adjacent to aperture 108.

In an embodiment, the angle formed between angled top surface 102 and each bottom surface 104 (as further discussed below with reference to FIGS. 3C and 4C) is preferably between about 45 degrees and 90 degrees, with each side panel 106 appropriately proportioned to abut bottom surface 104 along its edges.

For angle A, it has been found that a range of angles between about 45 degrees and about 50 degrees minimizes the collection of rain or snow on the top surface, allowing virtually all moisture on angled top surface 102 to be directed away from the protected electrical outlet.

In the illustrative embodiment shown in FIG. 1, angled top surface 102 is angled at about 45 degrees from horizontal, and extends horizontally until it is halfway down hood 100. In this example, angled bottom surface 104 is also angled at about 45 degrees from horizontal in the opposite direction, such that angled top surface 102 and angled bottom surface 104 form a right angle with respect to each other, such that angle A is 90 degrees. Side panel 106 therefore forms a right angle triangle.

Still referring to FIG. 1, mounting holes 110 may be used to securely mount hood 100 onto a vertical surface, such as a wall, or the surface of a panel. Suitable weather sealing may be provided between hood 100 and the wall or panel surface, such that moisture is prevented from entering any gaps at the top or the sides of hood 100. For example, a rubber gasket, foam or silicone caulking may be used to form a weatherproof seal along the top of hood 100.

In another embodiment, aperture 108 in the bottom surface 104 is suitably shaped and sized to receive various devices. As bottom surface 104 is angled (in this example at 45 degrees from horizontal), aperture 108 must accommodate various devices inserted at an angle relative to bottom surface 104.

In another embodiment, aperture 108 in bottom surface 104 is suitably shaped and sized to receive various cut-out plates, as detailed further below with reference to FIGS. 11A to 11C.

In another embodiment, in order to provide adequate drainage, hood 100 may include suitably-sized drainage holes in each bottom surface 104, and a non-gasketed bottom lip to allow moisture to drain below hood 100.

Figure 2:
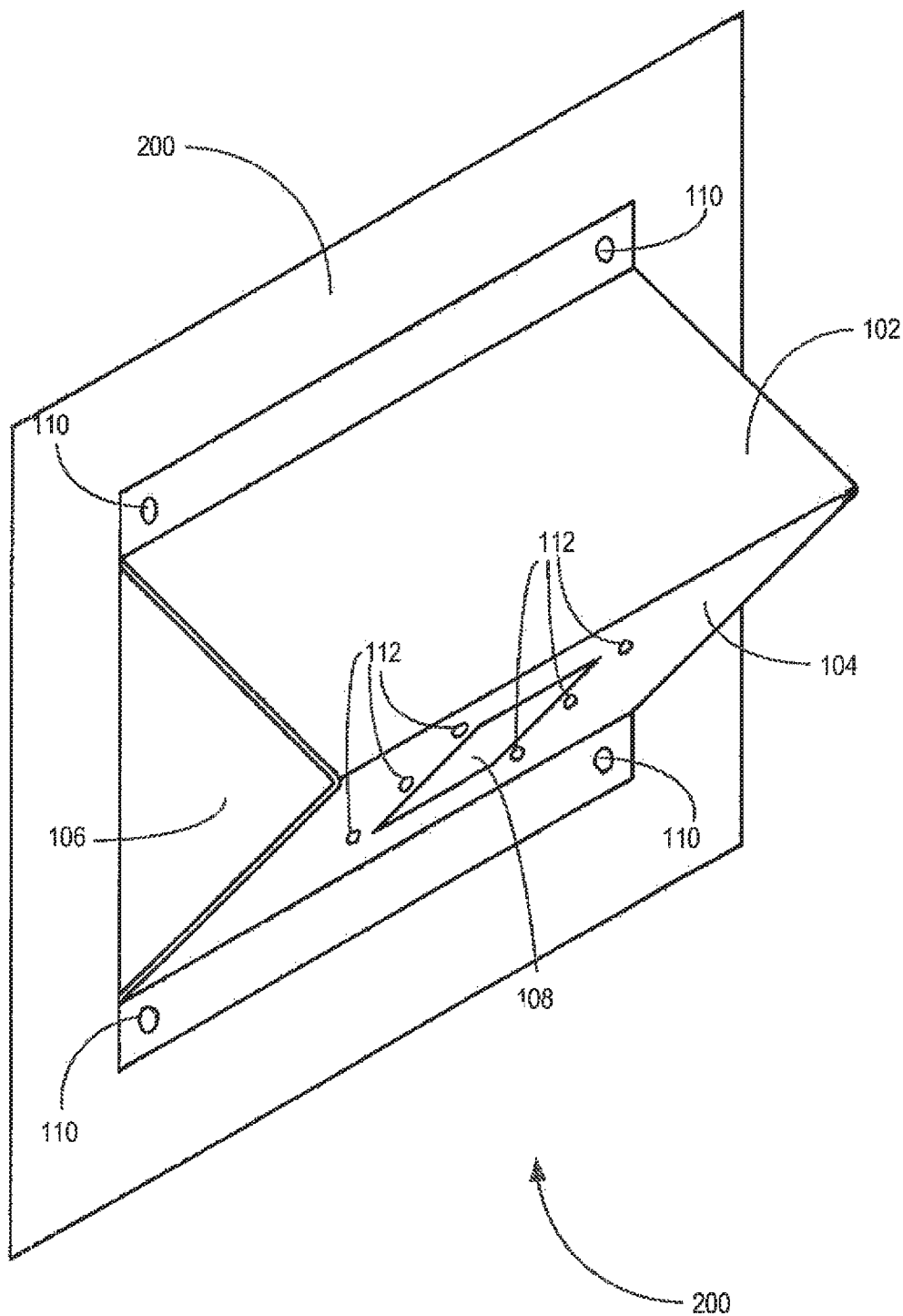
FIG. 2 shows a perspective view of a protective hood and extended base in accordance with another illustrative embodiment.

FIG. 2 shows a perspective view of a protective hood 100 and extended base 200 in accordance with another illustrative embodiment. In this case, extended base 200 provides a greater surface area for mounting hood 100 against a vertical surface. Extended base 200 further provides additional means by which to weather seal all sides of hood 100 against the vertical mounting surface. It will be appreciated that extended base 200 may be any suitable shape and width to perform the described function, and may include additional features to simplify mounting hood 100 onto a vertical mounting surface.

Figure 3A:
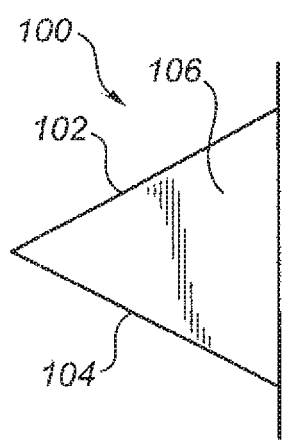
FIGS. 3A and 3B show schematic plan views of a protective hood in accordance with an embodiment.
Figure 3B:
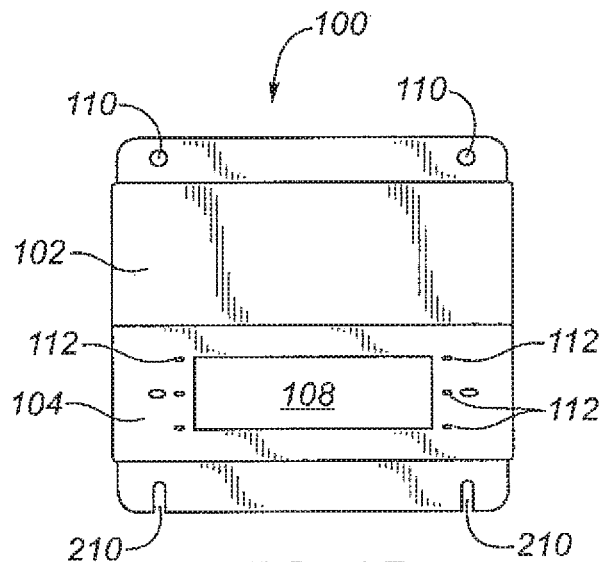

FIGS. 3A and 3B show are schematic side and front views, respectively, of a protective hood 100 in accordance with an embodiment. As shown in the front view in FIG. 3B, aperture 108 is suitably shaped and sized to receive one or more electrical cords and plugs to access one or more electrical outlets protected by hood 100. The side view in FIG. 3A shows that side panels 106 form a triangle with a sharper angle formed between its top and bottom edges (for example, about 54 degrees), rather than 90 degrees as shown in FIGS. 1 and 2.

Figure 3C:
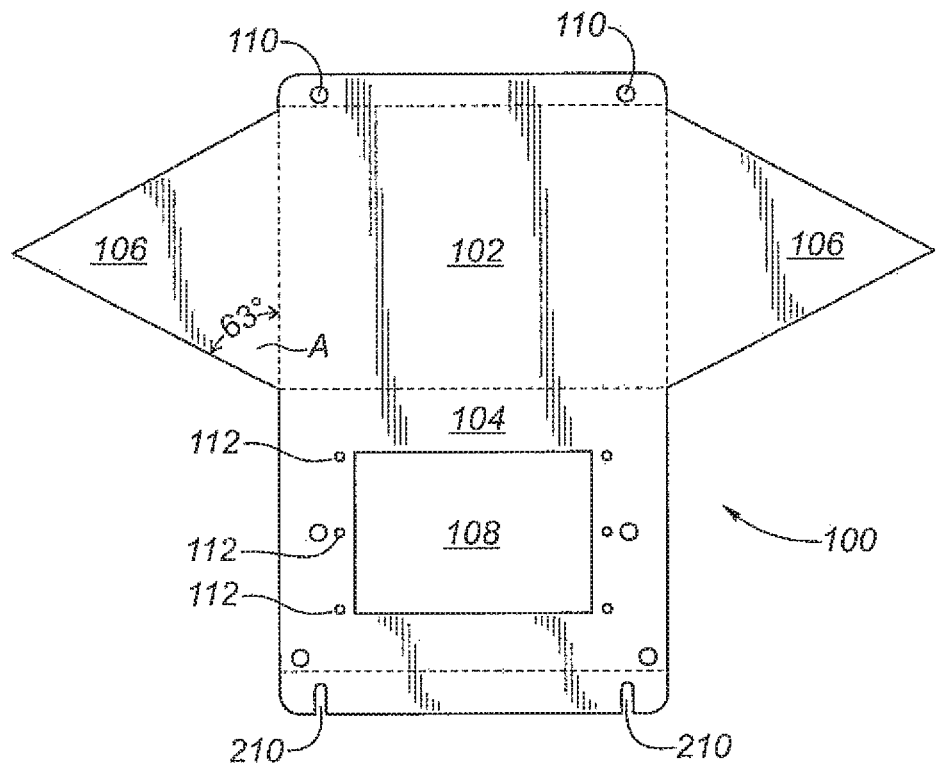
FIG. 3C shows a schematic plan view of a flat sheet which may be folded into the protective hood of FIGS. 3A and 3B.

FIG. 3C shows a schematic plan view of a flat sheet which may be folded into the protective hood of FIGS. 3A and 3B by folding along the dotted fold lines. With side panels 106 shown as wings attached to top surface 102, the top of hood 100 provides complete protection against moisture along the fold line between top surface 102 and side panels 106. In this example, bottom surface 104 is approximately the same size as top surface 102, and abuts side panels 106 along their free edges. As noted above, this edge can be weather-sealed with a suitable weather-sealing material, or alternatively this edge may be welded, or otherwise joined to provide a seal. However, in another embodiment, this edge may also provide a slight gap (e.g., 0.02 inch) in order to allow venting into or out of hood 100. As discussed earlier, the angle A formed between angled top surface 102 and each bottom surface 104 is preferably between about 45 degrees and 90 degrees, with each side panel 106 appropriately proportioned to abut bottom surface 104 along its edges. In this example, angle A is shown to be 63 degrees.

FIGS. 4A and 4B show schematic plan views of a protective hood in accordance with another embodiment. While this embodiment is similar to the one shown in FIGS. 3A and 3B, aperture 108 is significantly different to accommodate another type of electrical outlet, and the corresponding electrical cords and plugs. As will be appreciated, virtually any type of electrical outlet may be accommodated by a suitably shaped and sized aperture 108.

FIG. 4C shows a schematic plan view of a flat sheet which may be folded into the protective hood of FIGS. 4A and 4B by folding along the dotted fold lines. Once again, the angle A formed between angled top surface 102 and each bottom surface 104 once hood 100 is folded is shown to be 63 degrees (by way of example).

Figure 5A:
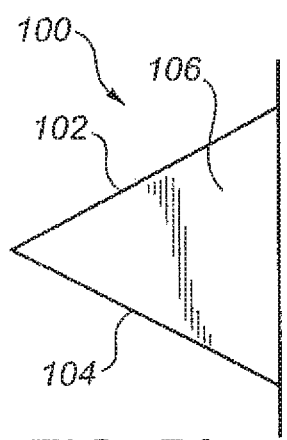
FIGS. 5A and 5B show schematic plan views of a protective hood in accordance with another embodiment.
Figure 5B:
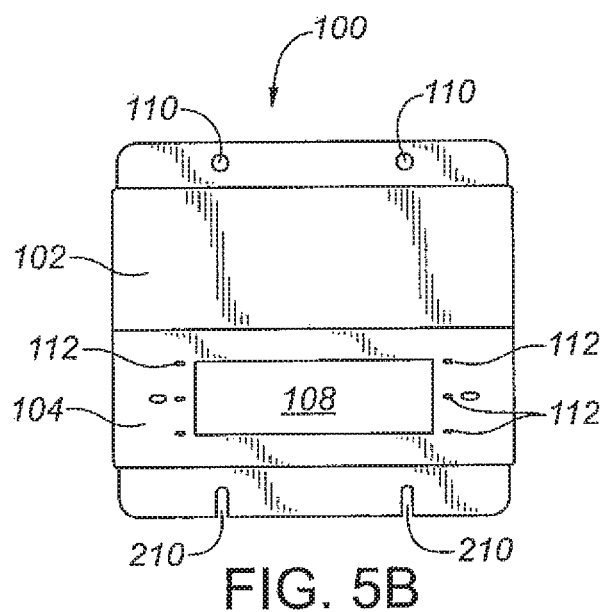
Figure 6A:
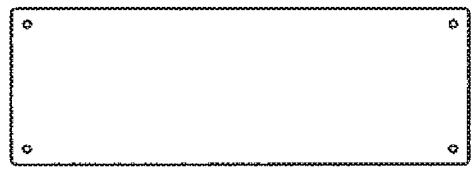
FIGS. 6A-6H, 7A-7G, 8A-8I, 9A-9I, and 10A-10I show different sizes and configurations of cut-out back plates in accordance with various embodiments.
Figure 6B:
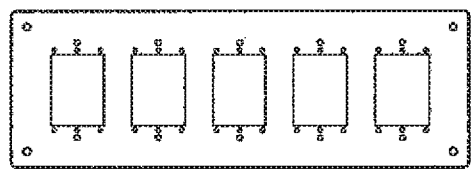
Figure 6C:
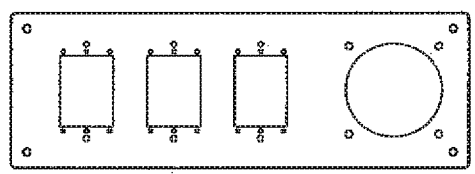
Figure 6D:
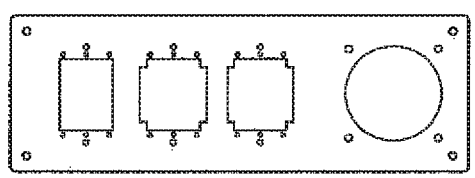
Figure 6E:
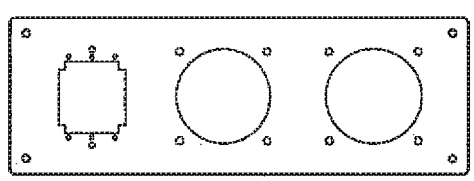
Figure 6F:
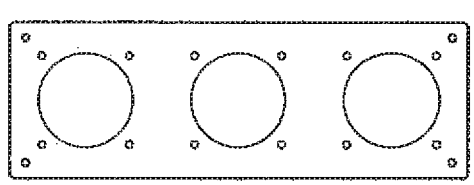
Figure 6G:
Figure 6H:
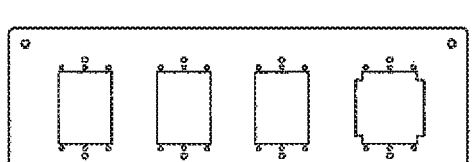
Figure 7A:
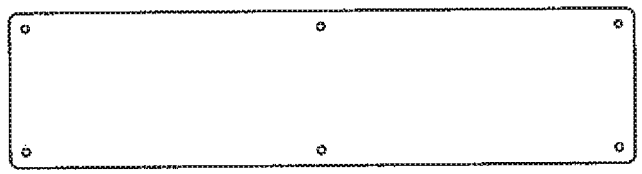
Figure 7B:
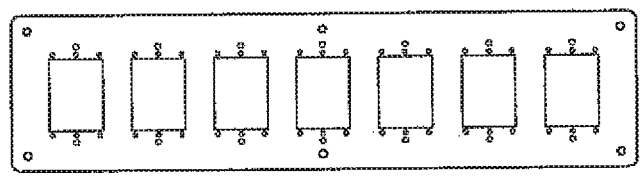
Figure 7C:
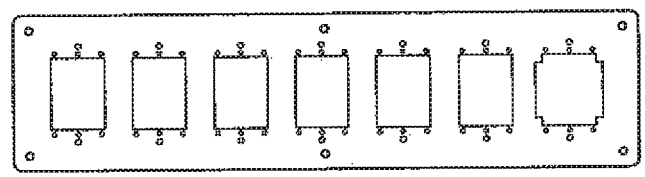
Figure 7D:
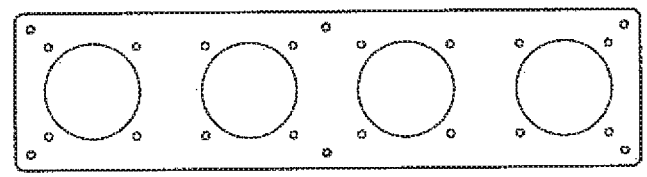
Figure 7E:
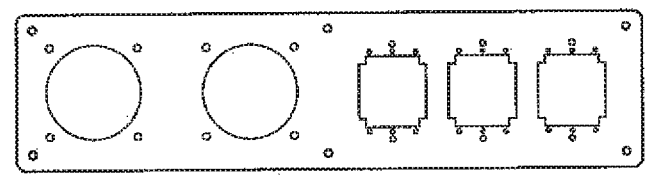
Figure 7F:
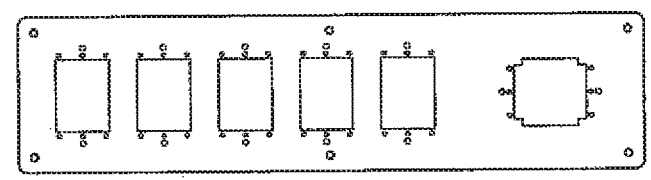
Figure 7G:
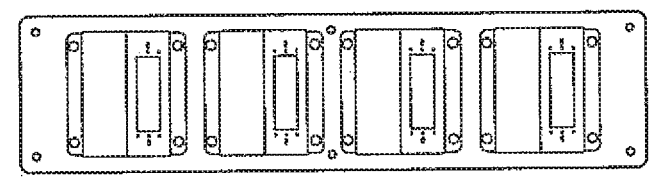
Figure 8A:
Figure 8B:
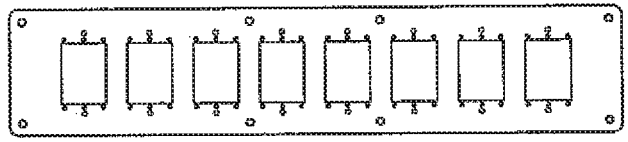
Figure 8C:
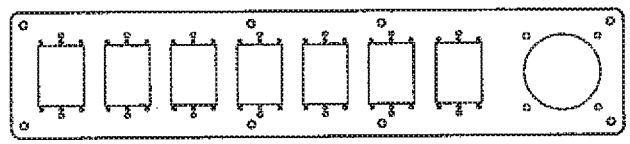
Figure 8D:
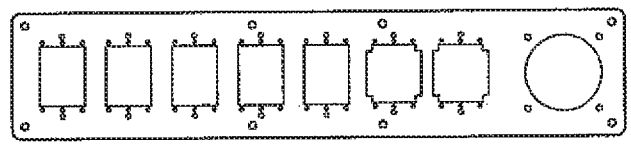
Figure 8E:
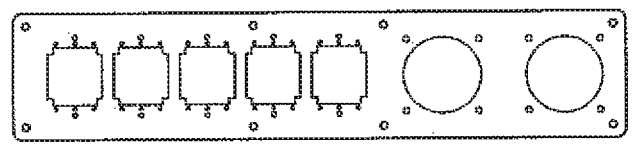
Figure 8F:
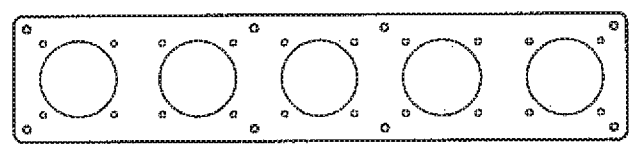
Figure 8G:
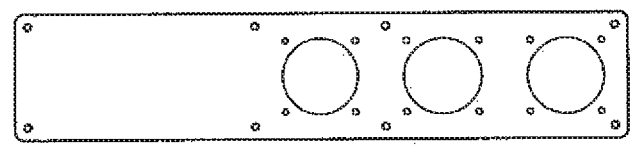
Figure 8H:
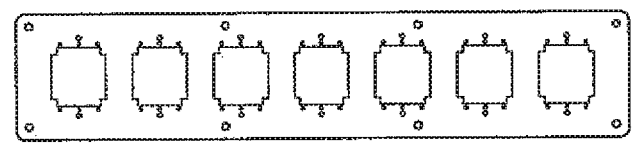
Figure 8I:
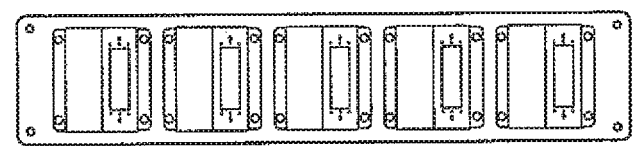
Figure 9A:
Figure 9B:
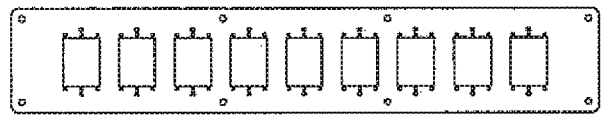
Figure 9C:
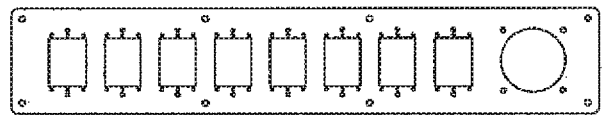
Figure 9D:
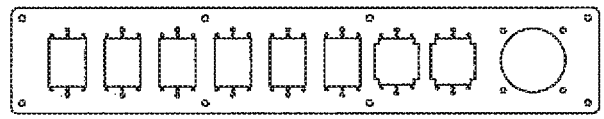
Figure 9E:
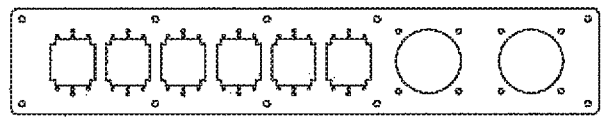
Figure 9F:
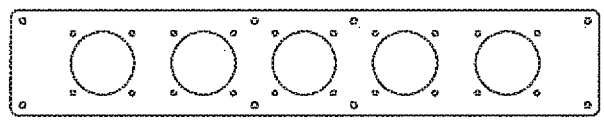
Figure 9G:
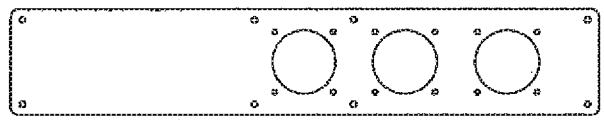
Figure 9H:
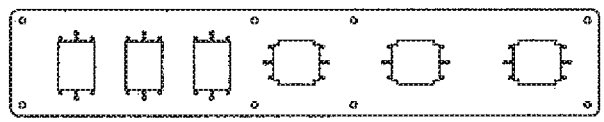
Figure 9I:
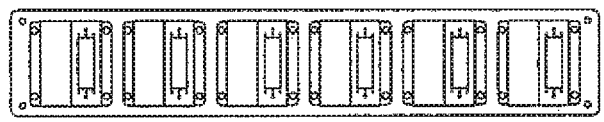
Figure 10A:
Figure 10B:
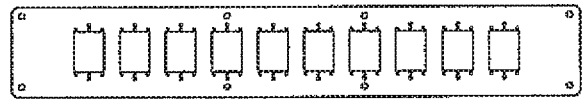
Figure 10C:
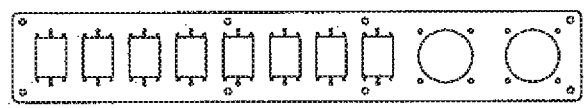
Figure 10D:
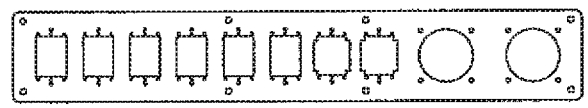
Figure 10E:
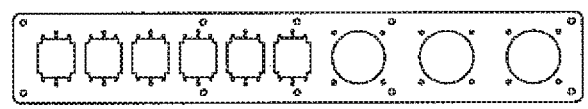
Figure 10F:
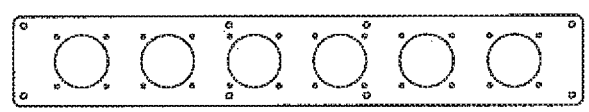
Figure 10G:
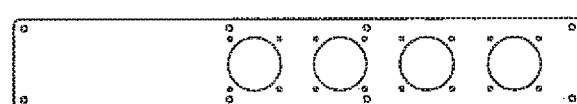
Figure 10H:
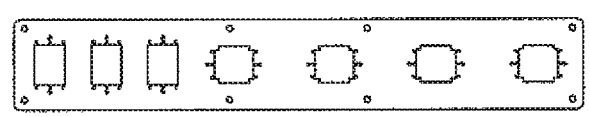
Figure 10I:
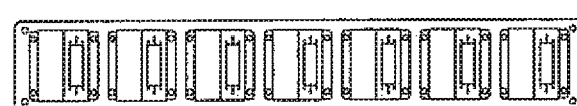

FIGS. 5A and 5B show a schematic plan view of a protective hood in accordance with another embodiment, in which the mounting holes and slots are repositioned to be mountable to different mounting holes provided on a wall or on a power pedestal.

Advantageously, protective hood 100 in accordance with the present disclosure may be readily fitted over existing outdoor electrical outlets, and may be sized to be compatible with any size of electrical box. This includes conventional outdoor household electrical outlets with flush wall-mount receptacle boxes, or electrical outlets with cast outlet boxes provided on outdoor pedestals or charging stations for electrical vehicles, for example. Hood 100 may be mounted by simply removing the existing device outlet, screw-mounting an angle adapter, and reinstalling the electrical outlet into position.

In an illustrative embodiment, protective hood 100 may be made from machine-formed galvanized steel. Once formed into shape, protective hood 100 may be painted using a suitable powder coat or paint to protect the surface from rusting and damage. Alternatively, rather than using steel, an insulative formable or moldable material may also be used, such as fibreglass, or injection-molded plastic.

FIGS. 6A-6H, 7A-7G, 8A-8I, 9A-9I, and 10A-10I show different sizes and configurations of cut-out back plates in accordance with various embodiments. As will be appreciated, the cut-out plates may be configured to be suitable for virtually any shape, size, or configuration of devices or power cords that may be accepted.

Figure 11A:
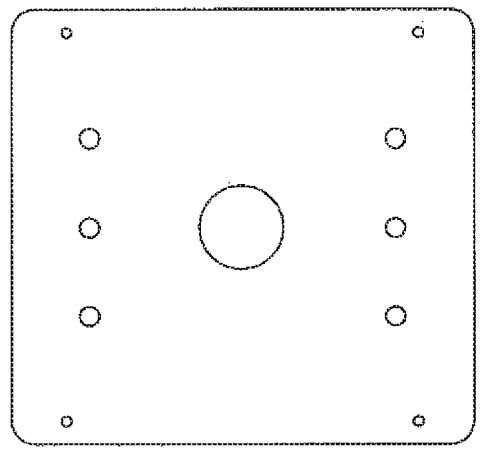
FIGS. 11A to 11C show illustrative horizontal, vertical, and combined horizontal and vertical device plates configured to be mounted to various cut-out back plates to receive standard electrical outlet boxes.
Figure 11B:
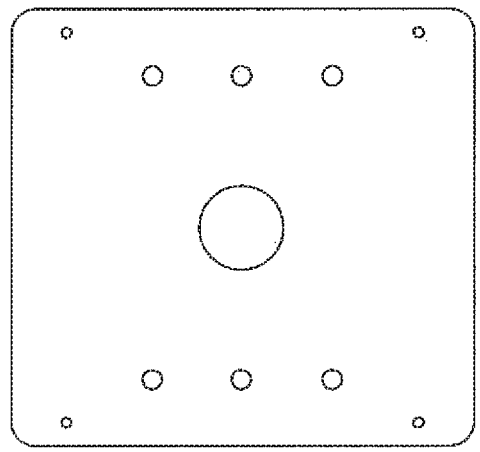
Figure 11C:
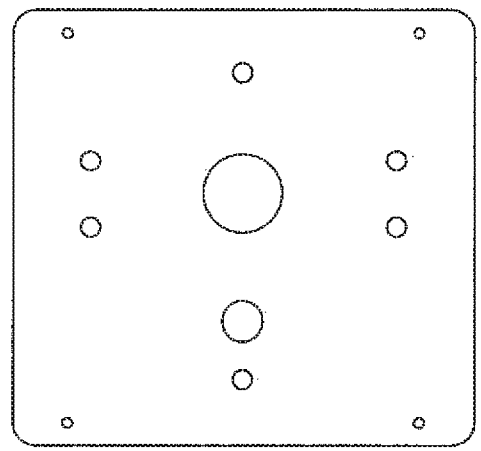
Figures 12A, 12B, 12C, 12D, 12E:
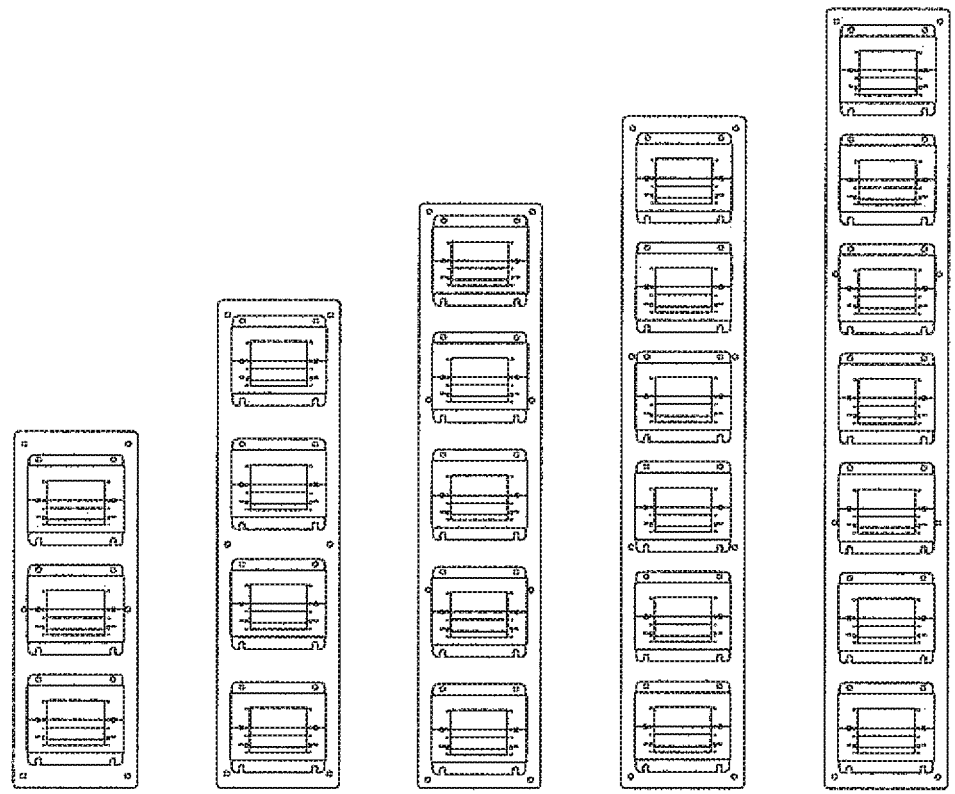
FIGS. 12A-12E show various illustrative embodiments in which a plurality of device plates are arranged vertically.

FIGS. 11A to 11C show illustrative horizontal, vertical, and combined horizontal and vertical device plates configured to be mounted to various cut-out back plates to receive standard electrical outlet boxes.

FIGS. 12A-12E show various embodiments of a device back plate having a different number of outlets.

Figure 13A:
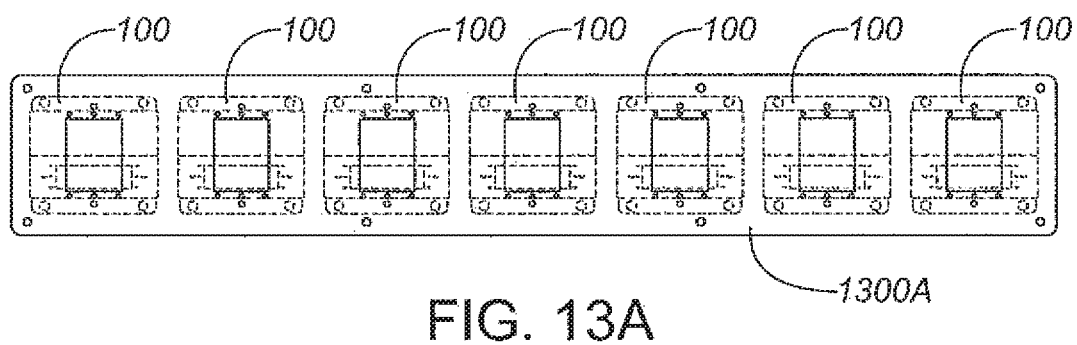
FIGS. 13A and 13B show illustrative horizontal and vertical cut-out back plates for supporting multiple protective hoods in accordance with illustrative embodiments.
Figure 13B:
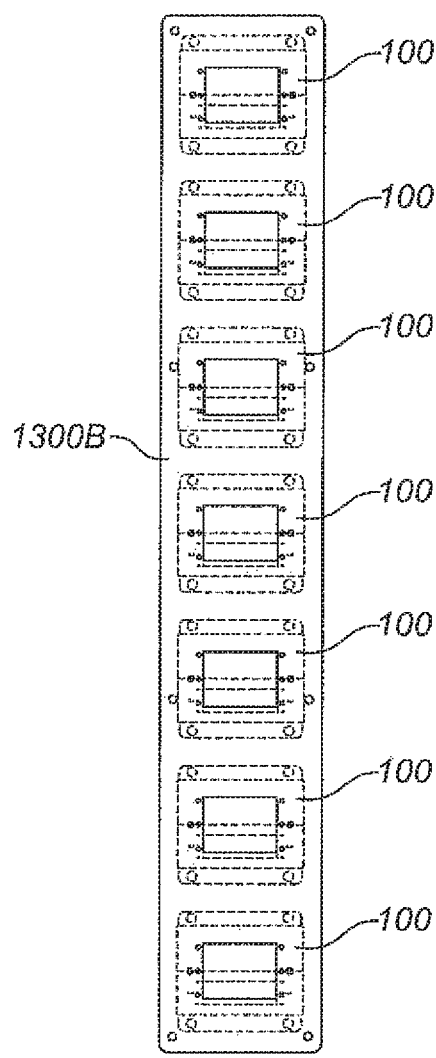

FIGS. 13A and 13B show horizontal and vertical back plates 600A and 600B, respectively, for supporting multiple protective hoods in accordance with illustrative embodiments. As shown, back plates 1300A, 1300B may support multiple protective hoods 100 arranged horizontally or vertically, allowing multiple receptacle connection points for applications requiring a large number of receptacles.

FIGS. 14A to 14C show an illustrative power pedestal 1400A in accordance with an embodiment. Preferably, power pedestal 1400A complies with industry standards such as an EEMAC (Electrical and Electronic Manufacturing Association of Canada)/NEMA (National Electrical Manufactures Association) Type 3R, and CSA (Canadian Standards Association), or similar electrical standards which may apply in other jurisdictions.

As shown in FIGS. 14A to 14C, an illustrative power pedestal 1400A includes a generally vertically-elongate body 1410, mounted to a base by means of a plurality of fasteners 1412. Elongate body 1410 may be made from a durable, long-lasting corrosion-resistant material, such as galvanized metal construction, to prevent rusting and assure a long-lasting quality finish. Various powder coat and paint colors may be used to prepare elongate body 1410 for outdoor applications.

In a preferred embodiment, the power pedestal has a generally smooth surface, with no visible mounting bolts or a flanged base which may trap moisture and may be prone to rust. One or more of the front, back, or side panels of elongate body 1410 may be removable to provide access to the panel.

As shown, a pedestal lid 1420 extends over all sides of elongate body 1410. Lid 1420 is maintained in place by a fastener 1422, and may be formed from a soft material with smooth edges to prevent cuts from scraping against edges or corners. The top surface of lid 1420 may also be suitably sloped by raising the center and to help drain moisture away.

In another embodiment, one or more receptacles 1430 are provided on at least one side of elongate body 1410, for example in a standard NEMA 5-15R configuration. However, it will be appreciated that various types of receptacles may be made available, including GFCI type receptacles to prevent shocks if the receptacles are inadvertently exposed to moisture. Furthermore, a suitable light source and photocell to turn on the light source at dusk may be provided near the receptacles to show their location and make insertion of power cords easier.

Each receptacle 1430 may be covered by a suitable self-closing cover, made of thermoplastic for example. One or more removable front access covers may be used to cover an opening on one of the sides of the power pedestal 1400A.

FIG. 14B illustrates an embodiment of an interchangeable (i.e., replaceable) pedestal base 1400B, having a frame 1440 with an opening, and a plurality of apertures 1442 for fastening pedestal base 1400B, 1400C. In an embodiment, pedestal base 1400B may also have vertically-extending flanges on each side, to which the vertically-elongate body 1410 may be attached by means of a plurality of fasteners 1412, such as self-tapping ⅜" mounting fasteners or galvanized screws, for example.

In an embodiment, pedestal base 1400B, 1400C may be constructed from galvanized steel, and mounted to elongate body 1410 by suitable galvanized screws. Preferably, elongate body 1410 is mounted in base 1400B, 1400C such that a gap 1450 is provided between elongate body 1410 and the ground or other supporting element (such as but not limited to a pile cap or a concrete footing). Gap 1450 significantly improves ventilation to the cabinet, and prevents elongate body 1410 from collecting moisture at its base around the bottom of the power pedestal.

Still referring to FIGS. 14A-14C, in an embodiment, the interchangeable pedestal base and/or the pedestal mounting hardware includes at least one stress-relief point, such that the power pedestal can break away either partially or completely from the interchangeable pedestal base if the power pedestal is accidentally struck, for example by a motor vehicle or trailer that is backing up in a driveway, parking lot, or RV camp site at which the power pedestal is installed.

In an embodiment, the stress-relief feature may be one or more weakened sections of the interchangeable pedestal base designed to allow the power pedestal to break away either partially or completely from the base with minimal damage to the power pedestal. For example, a weakened section may be formed by utilizing a material with a lower threshold for deformation, such as a thinner sheet metal, or a plastic material. Alternatively, a partial cut-out may be formed into a section of the pedestal base to form a designed point of failure.

This breakaway feature sacrifices a relatively low-cost part, such as the interchangeable pedestal base or the mounting hardware, to minimize damage on the power pedestal with its more costly parts and components.

In a similar manner, protective hoods mounted on the power pedestal may also be configured to be deformable, such that the protective hoods can at least partially absorb the impact of the motor vehicle or trailer, and can be readily replaced with a replacement hood if damaged. On the sides of the power pedestal that do not have protective hoods mounted, a sacrificial plate or resilient bumper guard may be provided to protect the power pedestal from damage.

In another embodiment, the power pedestal has a profile whereby its base is not extended, but rather the same size as the body all the way to the base. The lack of any extending flanges also helps avoid collection of moisture near the base to prevent corrosion.

The power pedestal is also suitably sized such that one or more receptacles may be provided at a suitable height for access. The one or more receptacles may be covered by a suitable receptacle cover to protect the receptacle from moisture. Each receptacle may be separately covered.

Referring to FIGS. 15A to 15D, shown is another illustrative power pedestal 1500A which provides a significantly shortened version of elongate body 1510, mounted to a base by means of a plurality of fasteners 1512. Power pedestal 1500A may be adapted to be EEMAC/NEMA Type 3R compliant for outdoor use.

Figure 15A:
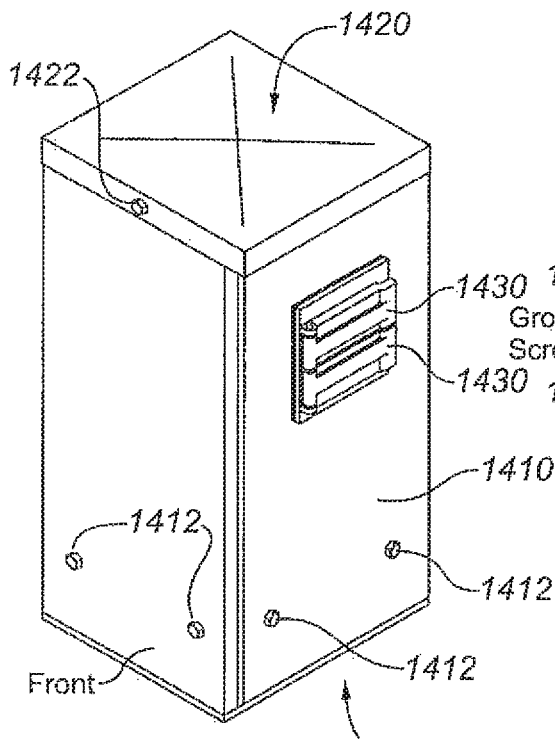
FIGS. 15A to 15D show an alternative embodiment of a power pedestal in accordance with another embodiment.
Figure 15B:
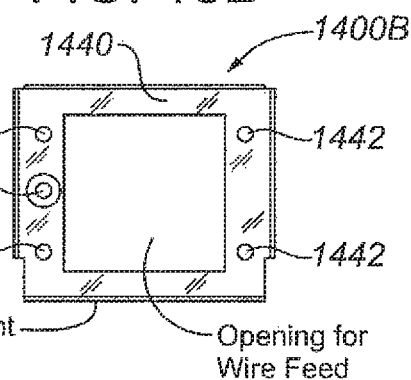
Figure 15C:
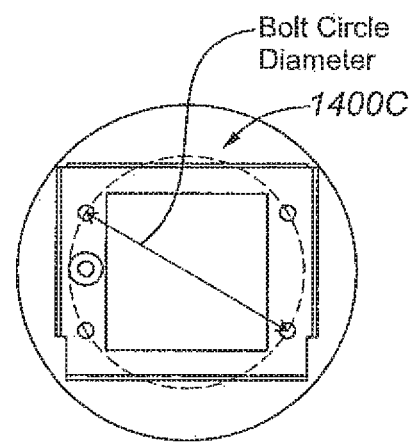
Figure 15D:
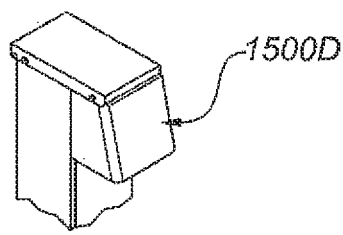

As shown in FIG. 15D, an optional hinged hood may be mounted over the outlet provided on the power pedestal.

FIGS. 15B and 15C show a base 1500B having an opening for feeds, and a plurality of apertures for fastening base 1500B to a surface. A ground screw may be provided to provide a point of contact for one or more ground wires which may have a direct electrical connection to earth or another ground.

FIG. 15D shows an alternative embodiment in which an optional hinged hood 1500D is provided to replace the standard hood 120 of FIG. 2A and to provide additional protection from precipitation, and to provide cover while the receptacle is in use. The hinged hood may be adapted to meet specified standards, such as CEC (Canadian Electric Code) Rule #26-702, for example.

Now referring to FIGS. 16A and 16B, shown is another illustrative embodiment of power pedestals having an electrical outlet, over which a protective hood may be mounted, such as the protective hood of FIG. 1. Each power pedestal 1600A, 1600B includes a circuit breaker 1610 which may provide additional protection from circuit overloads to improve safety of power pedestals 1600A, 1600B. By way of example, the circuit breakers may be 10 kAIC (kilo Amp Interrupting Capacity) molded-case-type breakers, and may be positioned just under the removable hoods to provide for easy local resetting capability, without having to open an entire panel. However, if access to the cabinet is necessary, one or more of the front, back, or side panels of pedestals 1600A, 1600B may be removed.

Figure 17A:
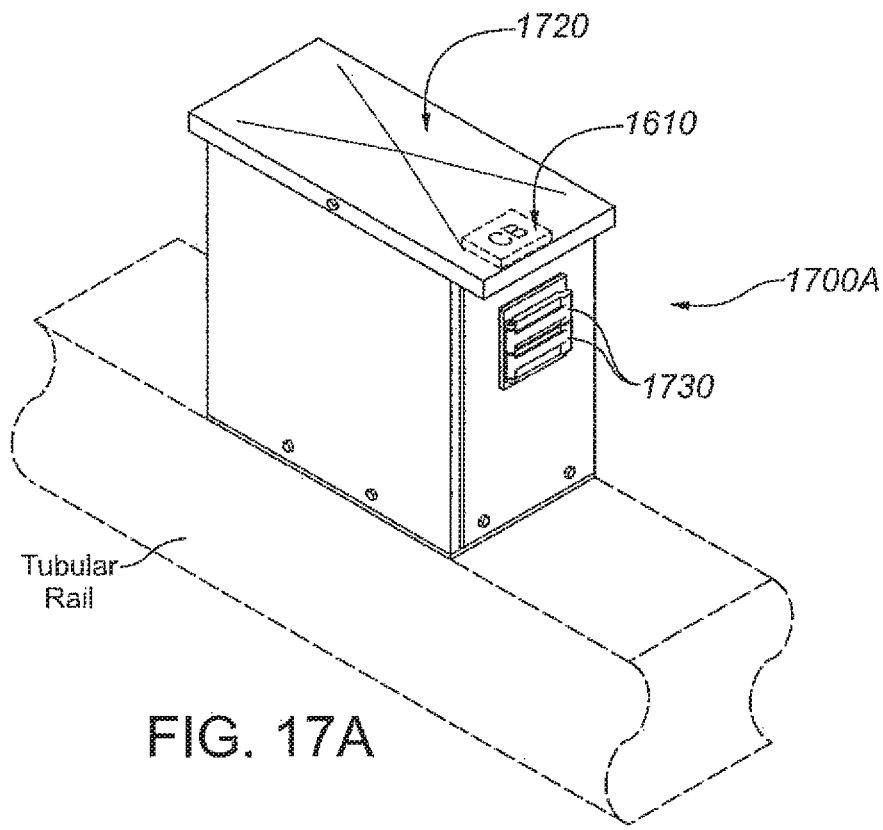
FIGS. 17A and 17B show another illustrative power pedestal in accordance with yet another embodiment.
Figure 17B:
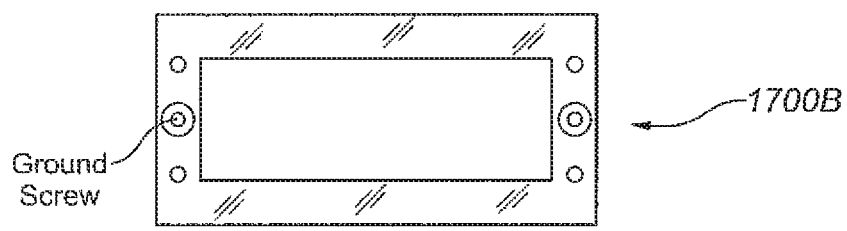

FIGS. 17A and 17B show another illustrative embodiment of a power pedestal 1700A and a corresponding base 1700B having a profile suitable for mounting the body of power pedestal 1700A. In this embodiment, power pedestal 1700A is shaped and sized to be mounted on top of a tubular rail that may be used, for example, in a parking lot. By way of example, these tubular rails may be 1M series HSS 5"×5" rails.

In this embodiment, base 1700B may have a feed-through aperture which allows electrical wires to be fed through the tubular rail and through base 1700B of power pedestal 1700A.

Figure 18A:
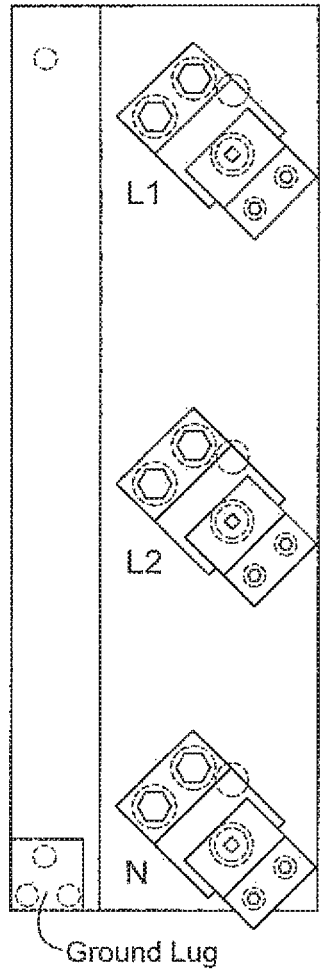
FIGS. 18A to 18C show illustrative examples of power pedestal terminal assemblies in accordance with various embodiments.
Figure 18B:
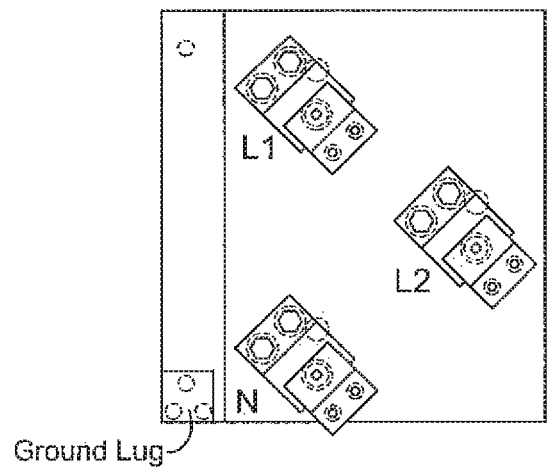
Figure 18C:
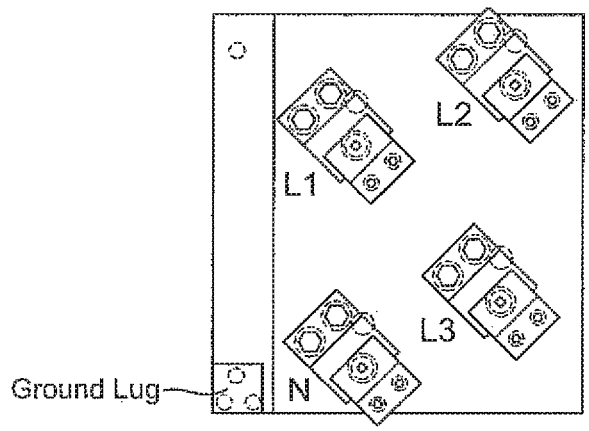
Figure 19A:
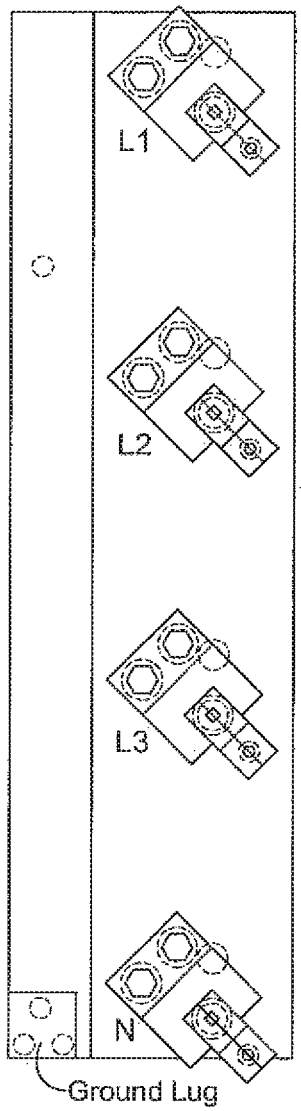
FIGS. 19A and 19B show additional illustrative examples of power pedestal terminal assemblies in accordance with various embodiments.
Figure 19B:
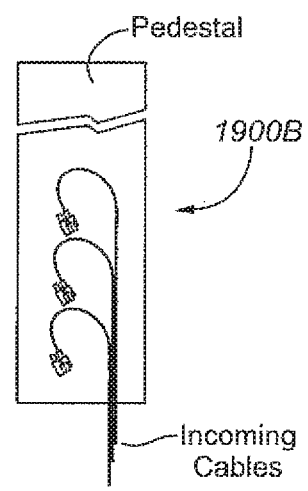

FIGS. 18A to 18C, 19A, and 19B show various configurations for different types of wire-binding plates, including 1-phase, 3-wire styles shown in FIGS. 18A and 5B, and 3-phase, 4-wire styles shown in FIGS. 18C and 19A. FIG. 19B shows conductors attached with excess loops at the point of termination to allow for some settling. Thus, different wire-binding plate configurations may accommodate different mounting in different sizes of power pedestals, depending on requirements.

Now referring to FIGS. 20A to 20C, shown is another illustrative embodiment of a power pedestal 2000A. As shown in FIG. 20B, an optional double-sided hood 2000B may be installed which has hinged panels 2010, 2012 on either side providing access to different types of receptacles.

As shown in FIG. 20A, optional molded-case circuit breakers (MCCB) rated at 10kAIC may be fed through 20 gauge copper or aluminum ring terminals attached to a ground bar to allow code compliance for feeder circuits over 60 amps.

As will be understood, the above illustrative embodiments may be implemented in various configurations. FIGS. 21A-21C, 22A-22C, 23A-23C, 24A-24C, 25A-25D, 26A-26D, and 27A-27C illustrate pedestal designs in accordance with various further embodiments.

Figure 21A:
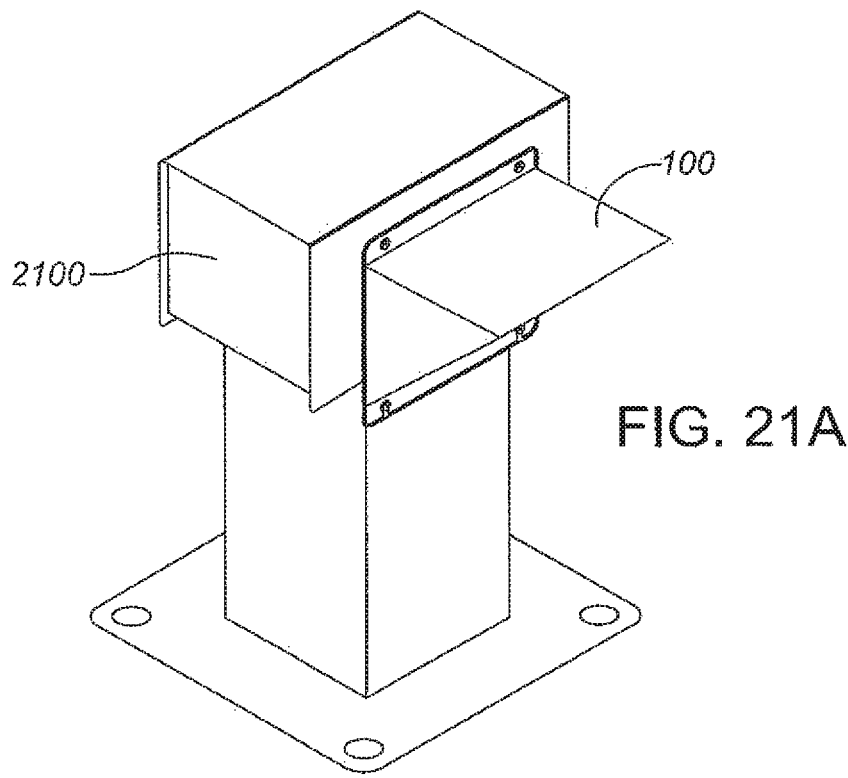
Figure 21C:
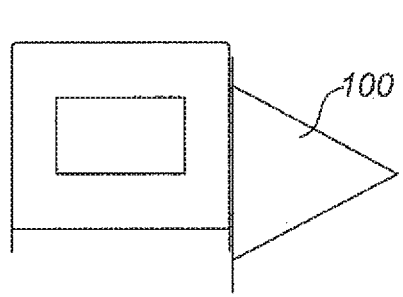
Figure 21B:
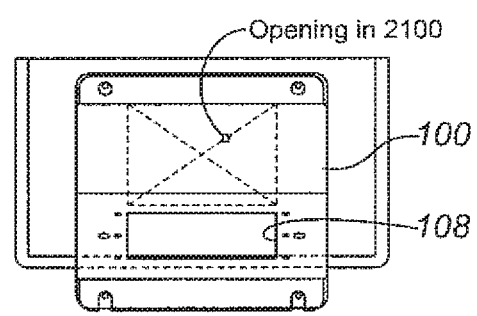

FIG. 21A shows a basic configuration in which the protective hood 100 is mounted to an electrical box 2100.

Figure 22A:
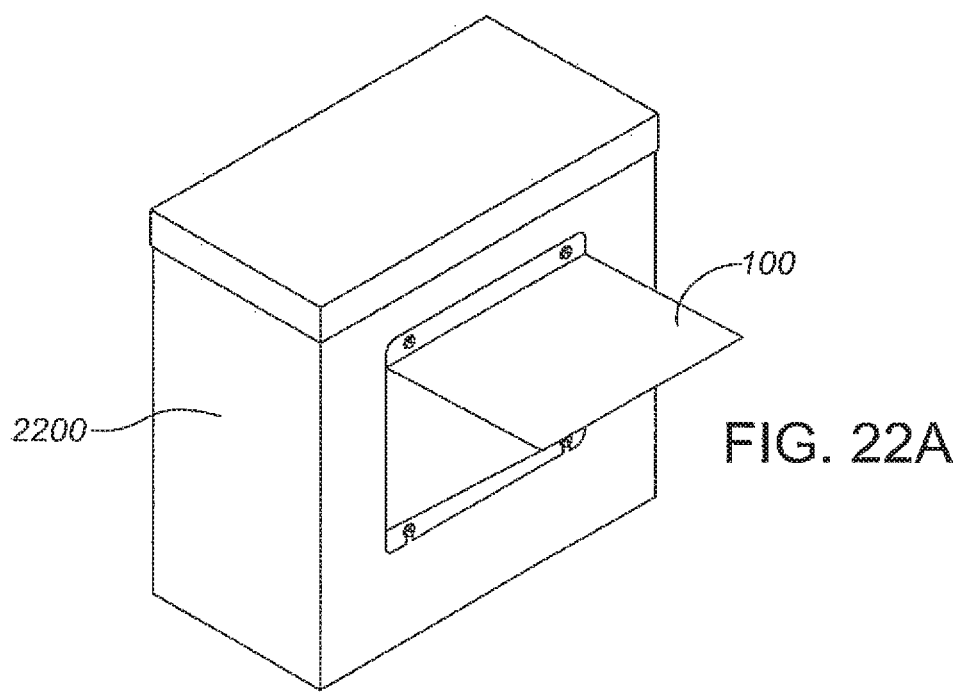
Figure 22C:
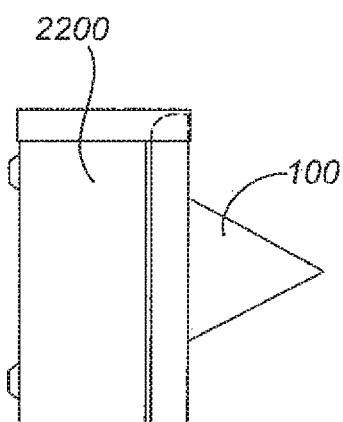
Figure 22B:
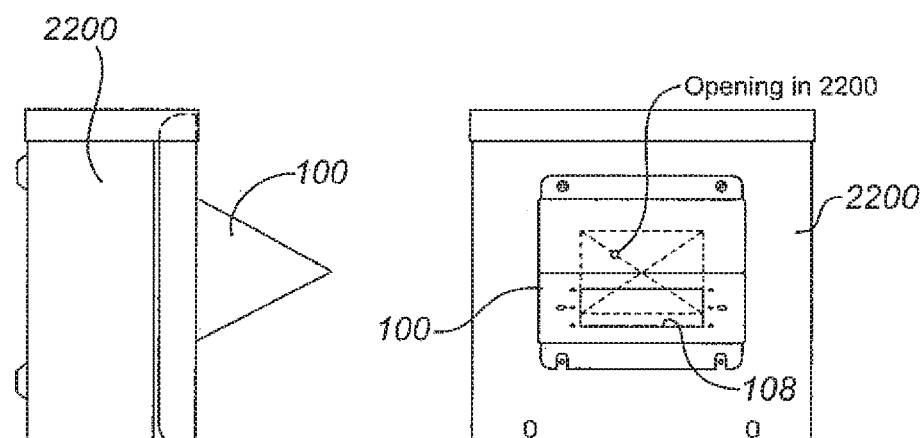

FIGS. 22A-22C show another configuration in which the protective hood 100 is mounted to an electrical box 2200.

FIGS. 23A-23C show an alternative configuration in which two protective hoods 100 are mounted to the same side of a pedestal 2300.

FIGS. 24A-24C show another configuration in which protective hoods 100 are mounted on opposite sides of an electrical box 2400.

Figure 25A:
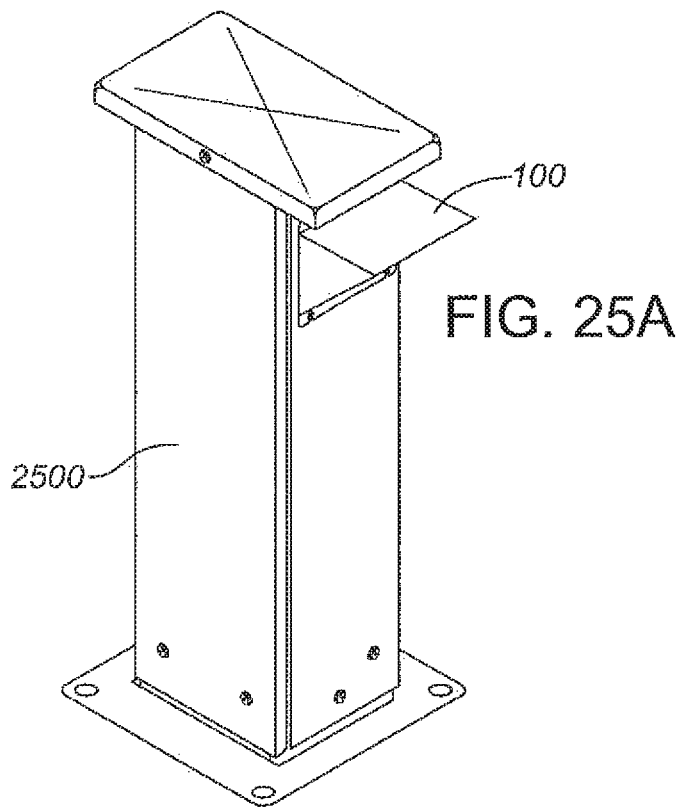
Figures 25B, 25C, 25D:
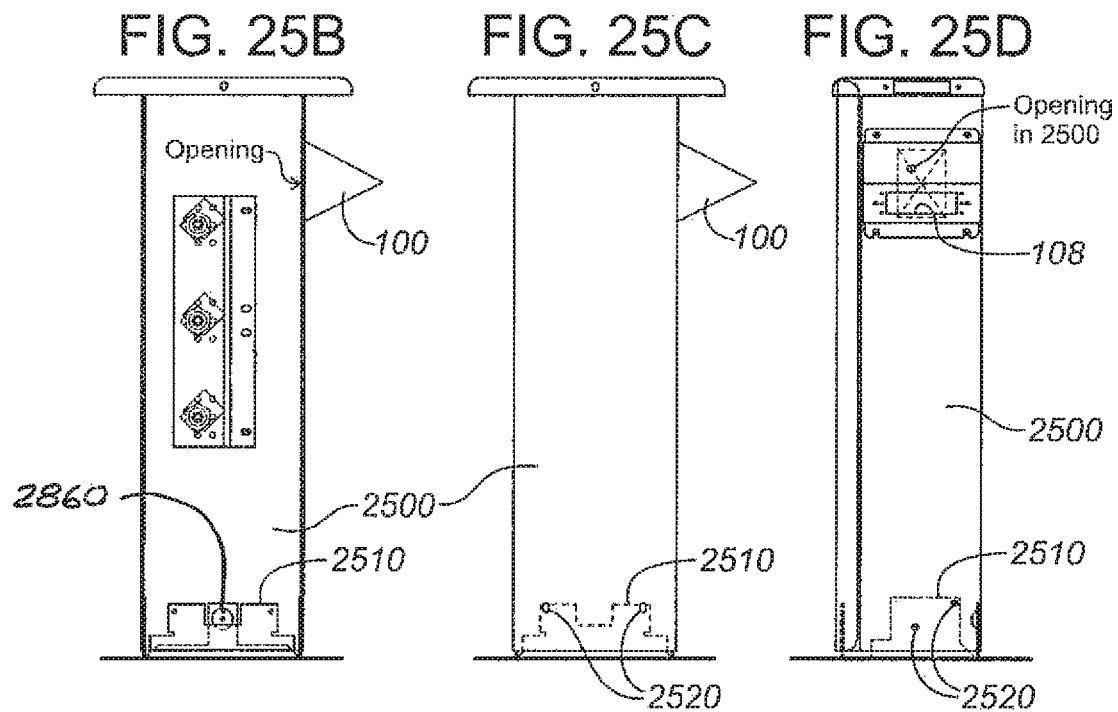

FIGS. 25A-25D show another configuration in which a protective hood 100 is mounted over an outlet provided near the top of a power pedestal 2500. In this configuration, a pedestal lid is provided with an overhang, which partially covers the top edge of the protective hood. As illustrated in FIGS. 25A-25D, pedestal 2500 has an interchangeable (i.e., replaceable) pedestal base 2510 fastened to pedestal 2500 with fasteners 2520. FIG. 25B illustrates the optional provision of a ground wire termination point 2860 in an upstanding flange of pedestal base 2510 (generally as described in greater detail below in the context of FIGS. 28A and 28C).

Figure 26A:
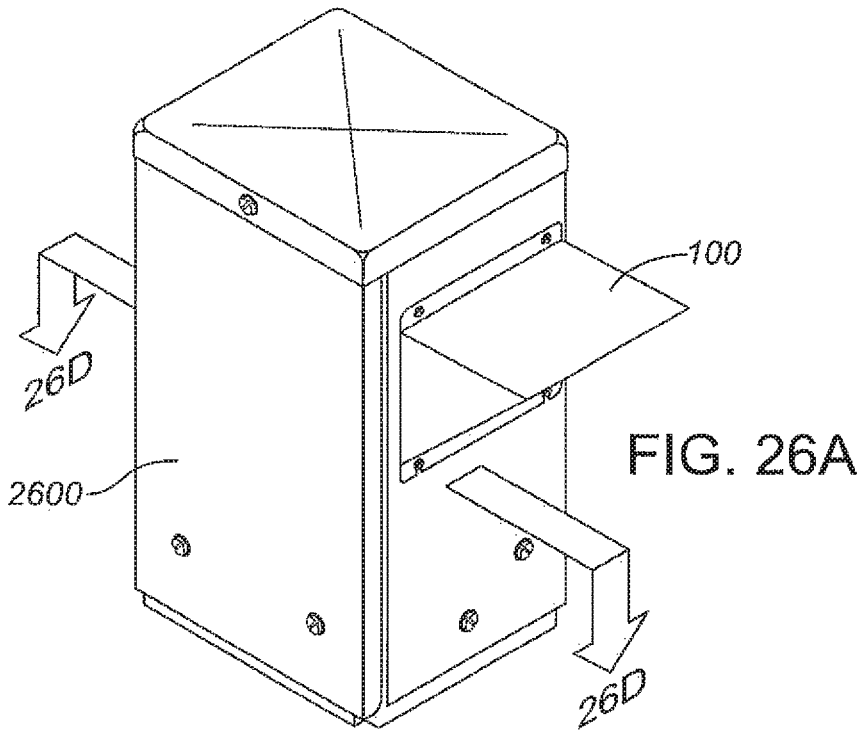
Figure 26B:
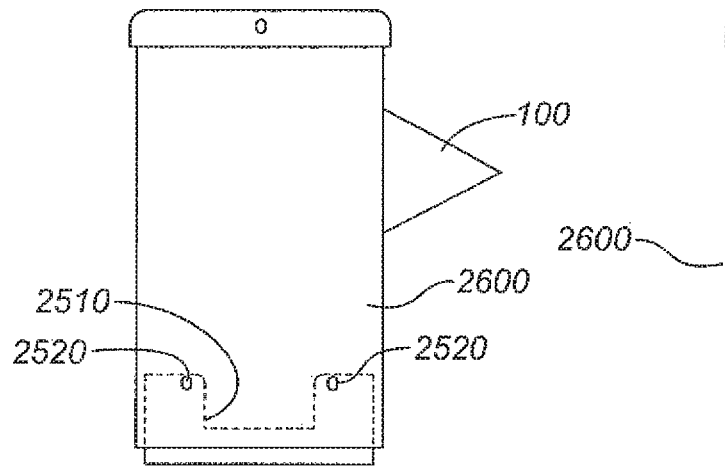
Figure 26C:
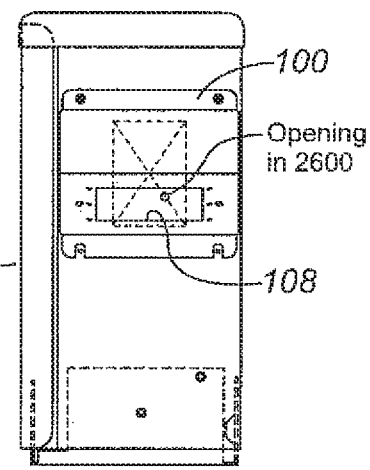
Figure 26D:
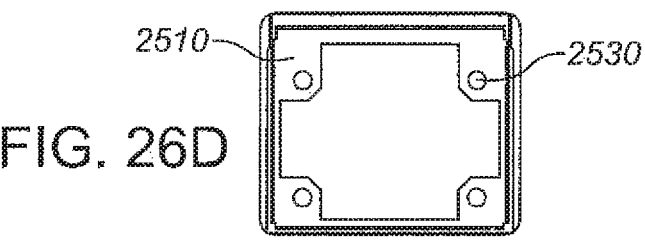

FIGS. 26A-26D illustrate a further configuration in which a protective hood 100 is mounted to a power pedestal 2600 having an interchangeable (i.e., replaceable) pedestal base 2510 fastened to pedestal 2600 with fasteners 2520. FIG. 26D is a cross-sectional plan view illustrating interchangeable pedestal base 2510 having anchor bolt holes 2530 to facilitate mounting of pedestal 2600 over anchor bolts projecting from a concrete foundation (not shown).

FIGS. 27A-27C illustrate a yet further configuration in which a protective hood 100 is mounted to a power pedestal 2700 having an interchangeable (i.e., replaceable) pedestal base 2510 fastened to pedestal 2600 with fasteners 2520.

FIGS. 28A-28C illustrate an alternative embodiment 2800 of a pedestal base particularly adapted to facilitate at least partial breakaway of a power pedestal from pedestal base 2800 in response to vehicular impact or other lateral force applied to the pedestal. Base 2800 has a central plate 2805 which has an opening 2850 for passage of electrical cables. Central plate 2805 has a desired number of anchor bolt holes 2842 for receiving anchor bolts 2844 for anchoring base 2800 to a concrete foundation or other support element 2870. A rear flange 2810, two opposing side flanges 2820, and a front flange 2830 project vertically from corresponding edges of central plate 2805, as best understood with reference to FIG. 28C. The lateral distances between rear flange 2810 and front flange 2830 and between side flanges 2820 are preferably selected for a reasonably close fit (but not necessarily a snug fit) within a power pedestal such as pedestal 1400A shown in broken outline in FIG. 28C.

In the embodiment shown in FIGS. 28A-28C, flanges 2810, 2820, and 2830 are provided with a selected number of fastener holes 2812 in selected locations, for receiving fasteners 1412 for connecting power pedestal 1400A to pedestal base 2800, as schematically illustrated in FIG. 28C. The locations of fastener holes 2812 shown in FIGS. 28A and 28C are exemplary only; suitable quantities and locations for fastener holes 2812 may vary according to design requirements or preferences for specific applications.

When pedestal 1400A is thus mounted to base 2800, an external lateral force FL applied to pedestal 1400A in the direction shown in FIG. 28C will be laterally reacted by anchor bolts 2844. However, force FL will also induce a counterclockwise overturning moment about a point of rotation X along a lower edge 2810L of rear flange 2810. In accordance with fundamental structural engineering principles, this moment will induce shear forces Fs acting vertically along the interfaces between front flange 2830 and side flanges 2820 and the corresponding sidewalls 1415 of pedestal 1400A. These shear forces will be resisted by fasteners 1412. However, the magnitude of the shear force induced in any given fastener 1412 will depend upon the total number of fasteners provided in each flange 2820 or 2830, as well as the lateral distance between a given fastener 1412 and from point of rotation X, and these shear forces can be readily estimated for a given lateral load FL using known methods of structural analysis.

Accordingly, stress-relief means may be provided in pedestal base 2800 by selecting the type, quantity, and locations of fasteners 1412 such that they will shear off before they can rupture or tear through the flanges in which they are installed. More specifically, with reference to the lateral loading scenario depicted in FIG. 28C, the fasteners 1412 in front flange 2830 should shear off before any of the fasteners 1412 in the other flanges. After the fasteners 1412 in front flange 2830 have sheared off, the shear loads that they were carrying will be transferred to the fasteners 1412 in side flanges 2820, which in turn may shear off (depending again on how many fasteners 1412 are provided in side flanges 2820).

However, the fasteners 1412 in rear flange 2810 will experience little if any induced shear loading given that they are essentially directly above point of rotation X with respect to the counter-clockwise overturning moment induced by lateral force FL. Accordingly, the ultimate result of the application of lateral force FL to pedestal 1400A will typically be for rear flange 2810 to bend downward as the impacted pedestal 1400A rotates, but with pedestal base 2800 remaining at least partially connected to pedestal 1400A because the fasteners 1412 in rear flange 2810 will not have sheared off. This continued connection of pedestal 1400A to pedestal base 2800 will be beneficial because it will tend to preserve the continuity and integrity of electrical conductors installed in pedestal 1400A despite the vehicular impact, thus reducing or eliminating the risk of electrical shock or electrocution, and thereby enhancing safety.

Alternatively, shear-relief means may be provided for pedestal base 2800 by selecting the type, quantity, and locations of fasteners 1412, as well as the material and thicknesses of flanges 2810, 2820, and 2830, such that the fasteners 1412 will tear through the flanges before they can shear off. In this scenario, the end result will be essentially the same as for the above-described scenario where there is sequential shearing failure of fasteners 1412, but the failure mechanism will be localized structural failure of the flange material rather than shearing of fasteners 1412. In a further alternative scenario, the failure mechanism may be a combination of flange material failure and fastener failure.

In the particular embodiment illustrated in FIG. 28A, front flange 2830 has a cut-out 2837 such that front flange 2830 defines sub-flange 2835 on either side of cut-out 2837. This optional design feature facilitates a third possible way of providing shear-relief means; i.e., depending on the number and type of fasteners provided, and the thickness and width of sub-flanges 2835, the moment induced by lateral force FL could result in tensile failure of sub-flanges 2835 before any of the fasteners 1412 in front flange 2830 shear off or cause localized tearing through the material of flange 2830.

Although the failure mechanism for alternative stress-relief means has been described by way of example with reference to the specific scenario of a lateral force FL acting in the direction from front to rear of pedestal base 2800, the failure mechanism would be essentially the same in scenarios where force FL acts in a different direction.

Pedestal base 2800 optionally may be provided with one or more ground wire termination points 2860 in one or more of flanges 2810, 2820, and 2830. As may be appreciated from FIGS. 28A and 28C, this feature facilitates the grounding of power pedestal 1400A to base 2800 at a point above the support element 2870 to which base 2800 is anchored. This feature can be beneficial in the above-described vehicular impact scenarios because it preserves the continuity and integrity of electrical grounding in spite of resultant displacement of the pedestal, thus reducing or eliminating the risk of electrical shock or electrocution and thereby enhancing safety.

FIG. 28A illustrates a flat sheet (such as but not limited to galvanized steel plate) that may be used to form pedestal base 2800, by folding or bending flanges 2810, 2820, and 2830 relative to central plate 2805 along respective bend lines 2811, 2812, and 2813. However, this is by way of non-limiting example only; in variant embodiments, pedestal base 2800 could be fabricated from separate plates elements joined together (such as by welding), or molded in final form from a synthetic material such as a plastic. Such alternative fabrication methods would enable central plate 2805 and flanges 2810, 2820, and 2830 to have different thicknesses or to be made from different materials. This may be advantageous for purposes of providing base 2800 with stress-relief means to prevent or minimize damage to power pedestal 1400A in response to vehicular impact or other external loading. For example, it may be advantageous for central plate 2805 to be thicker than flanges 2810, 2820, and 2830 in embodiments for which it is desirable for base 2800 to remain anchored to support element 2870 after flanges 2810, 2820, and 2830 have been deformed in response to vehicular impact.

Thus, in an aspect, there is provided a protective device for an outdoor electrical outlet, comprising at least one angled top surface, at least two side panels adjoining the top surface, and an angled bottom surface having an aperture.

In an embodiment, the angled top surface is angled downwardly to extend to a sufficient horizontal distance from the wall, such that the angled top surface substantially covers and protects the electrical outlet from the top.

In another embodiment, the angled top surface joins the angled bottom surface at an apex, and wherein an angle A formed between the angled top surface and the angled bottom surface is between about 45 degrees and 90 degrees.

In another embodiment, the aperture on the angled bottom surface is suitably sized and shaped to receive a power cord from an electrical device.

In another embodiment, the two side panels adjoining the top surface are further adjoined to edges of the angled bottom surface.

In another embodiment, the protective device is adapted to be installed over electrical outlets or receptacles provided on a power pedestal.

In another embodiment, the protective device is adapted to be deformable and replaceable upon receiving any damage to the protective device.

In another embodiment, the protective device is formed from sheet metal that is folded to form each section of the protective device.

In another embodiment, the protective device is formed from an insulative formable or moldable material, such as fibreglass or injection-molded plastic.

In another embodiment, the bottom end of the protective device is adapted to provide one or more moisture drainage openings to allow moisture to drain from the protective device.

In another aspect, there is provided a power pedestal adapted to receive a protective device for each electrical outlet provided on the power pedestal, with the protective device comprising at least one angled top surface, at least two side panels adjoining the top surface, and an angled bottom surface having an aperture.

In an embodiment, the power pedestal is further adapted to mount a plurality of protective devices over a plurality of electrical outlets arranged vertically or horizontally.

In another embodiment, the power pedestal is further adapted to receive a cut-out back plate for mounting one or more different types of standard electrical boxes.

In another embodiment, the power pedestal further comprises an interchangeable (i.e., replaceable) pedestal base adapted to mount the power pedestal, and wherein the power pedestal base includes at least one built-in stress-relief feature adapted to allow the power pedestal to break away either partially or completely from the pedestal base if an external mechanical stress on the pedestal base exceeds a predetermined breaking point.

In another embodiment, the at least one built-in stress-relief feature comprises a material with a lower threshold for deformation, or a partial cut-out of a section of the interchangeable pedestal base forming a designed point of failure.

In another embodiment, the interchangeable pedestal base is adapted to mount the power pedestal to a base with at least a minimum clearance gap such that the power pedestal is ventilated from below.

In another embodiment, the power pedestal further comprises one or more additional ventilation grills on one or more sides of the power pedestal cabinet.

In another embodiment, the power pedestal further comprises a circuit breaker to interrupt electrical current to each outlet if a ground fault is detected.

In another embodiment, the angled top surface is angled downwardly to extend to a sufficient horizontal distance from the wall, such that the angled top surface substantially covers and protects the electrical outlet from the top.

In another embodiment, the angled top surface joins the angled bottom surface at an apex, and wherein an angle A formed between the angled top surface and the angled bottom surface is between about 45 degrees and 90 degrees.

It will be readily appreciated by those skilled in the art that various modifications to embodiments in accordance with the present disclosure may be devised without departing from the present teachings, including modifications that may use structures or materials later conceived or developed. It is to be especially understood that the scope of the present disclosure and claims should not be limited to or by any particular embodiments described, illustrated, and/or claimed herein, but should be given the broadest interpretation consistent with the disclosure as a whole. It is also to be understood that the substitution of a variant of a described or claimed element or feature, without any substantial resultant change in functionality, will not constitute a departure from the scope of the disclosure or claims.

In this patent document, any form of the word "comprise" is to be understood in its non-limiting sense to mean that any element or feature following such word is included, but elements or features not specifically mentioned are not excluded. A reference to an element or feature by the indefinite article "a" does not exclude the possibility that more than one of the element or feature is present, unless the context clearly requires that there be one and only one such element or feature. Any use of any form of the terms "connect", "engage", "attach", or any other term describing an interaction between elements is not meant to limit the interaction to direct interaction between the subject elements, and may also include indirect interaction between the elements such as through secondary or intermediary structure.

Relational or conformational terms such as but not limited to "vertical" or "horizontal" are not intended to denote or require absolute mathematical or geometrical precision. Accordingly, such terms are to be understood as denoting or requiring substantial precision only (e.g., "substantially vertical" or "generally horizontal") unless the context clearly requires otherwise. Any use of any form of the term "typical" is to be interpreted in the sense of being representative of common usage or practice, and is not to be interpreted as implying essentiality or invariability.

What is claimed is:

1. A protective hood for an outdoor electrical outlet, said protective hood comprising:
    (a) a flat top surface having an inner edge, an outer edge, and opposing side edges extending between said inner and outer edges of the top surface;
    (b) a bottom surface having an inner edge, an outer edge, and opposing side edges extending between said inner and outer edges of the bottom surface, with the outer edge of the bottom surface being parallel to and adjoining the outer edge of the top surface, and with the top and bottom surfaces being oriented so as to enclose an between about 45 degrees and about 90 degrees along the juncture of the outer edges the top and bottom surfaces; and
    (c) two opposing side panels, each extending between the top and bottom surfaces, proximal to corresponding side edges thereof;
wherein:
    (d) the bottom surface slopes upward and away from the inner edge of the bottom surface, relative to a reference plane extending between the inner edges of the top and bottom surfaces;
    (e) the bottom surface has an aperture, wherein said aperture is sized to receive one or more power cords or an electrical outlet; and
    (f) the top surface is perpendicular to said reference plane.

2. The protective hood of claim 1, further comprising an extended base connected to the protective hood along the inner edges of the top and bottom surfaces, to facilitate mounting of the protective hood to a support structure.

3. The protective hood of claim 1, wherein the protective hood is adapted for mounting over one or more electrical outlets installed on a support structure.

4. The protective hood of claim 3, wherein the support structure is a building wall or a power pedestal.

5. The protective hood of claim 3, wherein the aperture in the bottom surface of the protective hood is sized to allow one or more power cords to be manually connected to or disconnected from the one or more electrical outlets.

6. The protective hood of claim 1, further comprising an electrical outlet mounted in the aperture in the bottom surface of the protective hood.

7. The protective hood of claim 6, wherein the protective hood is mounted to a vertically-oriented support structure and the electrical outlet is connected to a power source associated with the support structure.

8. The protective hood of claim 7, wherein the support structure is a building wall or a power pedestal.

* * * * *